US011328197B2

(12) United States Patent
Carr et al.

(10) Patent No.: US 11,328,197 B2
(45) Date of Patent: May 10, 2022

(54) METHOD AND A SYSTEM FOR MONITORING A QUANTITY RELATED TO AN ASSET

(71) Applicant: SILICON CONTROLS PTY LTD., Macquarie Park (AU)

(72) Inventors: Anthony Robert Carr, Pymble (AU); Michael Alexander St. Leger Neuman, Milsons Point (AU); Robert William Gerald Battye, Wahroonga (AU)

(73) Assignee: SILICON CONTROLS PTY LTD.

( * ) Notice: Subject to any disclaimer, the term of this patent is extended or adjusted under 35 U.S.C. 154(b) by 84 days.

(21) Appl. No.: 17/004,325

(22) Filed: Aug. 27, 2020

(65) Prior Publication Data

US 2020/0394488 A1 Dec. 17, 2020

Related U.S. Application Data

(63) Continuation of application No. 16/720,343, filed on Dec. 19, 2019, now Pat. No. 11,003,974, which is a
(Continued)

(30) Foreign Application Priority Data

Sep. 29, 2017 (AU) ................. 2017903959

(51) Int. Cl.
*G06K 19/077* (2006.01)
*H04Q 9/00* (2006.01)
(Continued)

(52) U.S. Cl.
CPC ...... *G06K 19/07716* (2013.01); *F17C 13/003* (2013.01); *F17C 13/028* (2013.01);
(Continued)

(58) Field of Classification Search
CPC ........ G06K 19/07716; G06K 19/0716; H04W 4/029; H04W 4/35; F17C 13/003; F17C 13/028; G06Q 10/087; H04Q 9/00
(Continued)

(56) References Cited

U.S. PATENT DOCUMENTS 10,380,534 B2 * 8/2019 Khasis ............... G06Q 10/0833
10,410,278 B2 * 9/2019 Altermatt ........... G06Q 30/0645
(Continued)

FOREIGN PATENT DOCUMENTS

WO 0177625 A1 10/2001
WO 2018071990 A1 4/2018

*Primary Examiner* — Michael G Lee
*Assistant Examiner* — David Tardif
(74) *Attorney, Agent, or Firm* — Rita C. Chipperson, Esq.; Chipperson Law Group, P.C.

(57) ABSTRACT

A method for automatically electronically associating vessel identity information of a vessel with an unassociated telemetric device, the unassociated telemetric device comprising a processor and being configured to detect and transmit quantity or usage data and being configured with a location sensing device, wherein the unassociated telemetric device is configured to communicate with a remote server, the method comprising the steps of: the remote server receiving the vessel identity information comprising a deployment location for the unassociated telemetric device; the unassociated telemetric device operating in accordance with an automatic action rule; in response to the unassociated telemetric device operating in accordance with the automatic action rule, the processor receiving location information of the unassociated telemetric device from the location sensing device; the unassociated telemetric device transmitting the location information; the remote server receiving the location information; the remote server correlating the location information with the vessel identity information when resolving that the location information represents that the
(Continued)

unassociated telemetric device is within a proximity to the deployment location, and the remote server automatically electronically associating the unassociated telemetric device with the vessel identity information, resulting in the unassociated telemetric device becoming an associated telemetric device, so that when the associated telemetric device generates quantity or usage information, the quantity or usage information transmitted by the associated telemetric device is applied to a data store of the remote server related to the vessel identity information.

11 Claims, 17 Drawing Sheets

Related U.S. Application Data continuation of application No. 16/143,820, filed on Sep. 27, 2018, now Pat. No. 10,552,721.

(51) Int. Cl.

| F17C 13/02 | (2006.01) |
|---|---|
| F17C 13/00 | (2006.01) |
| H04W 4/029 | (2018.01) |
| H04W 4/35 | (2018.01) |
| G06K 19/07 | (2006.01) |
| G06Q 10/08 | (2012.01) |

(52) U.S. Cl.
CPC ....... *G06K 19/0716* (2013.01); *G06Q 10/087* (2013.01); *H04Q 9/00* (2013.01); *H04W 4/029* (2018.02); *H04W 4/35* (2018.02); *F17C 2201/032* (2013.01); *F17C 2201/054* (2013.01); *F17C 2221/035* (2013.01); *F17C 2223/0153* (2013.01); *F17C 2250/034* (2013.01); *F17C 2270/0134* (2013.01); *F17C 2270/0147* (2013.01); *H04Q 2209/00* (2013.01); *H04Q 2209/40* (2013.01)

(58) Field of Classification Search
USPC .......................................................... 235/385
See application file for complete search history.

(56) References Cited

U.S. PATENT DOCUMENTS

| 2005/0088307 | A1 | 4/2005 | Schaffer et al. | |
| 2005/0248454 | A1* | 11/2005 | Hanson | G06Q 10/087 340/539.26 |
| 2006/0033931 | A1 | 2/2006 | Cuppies et al. | |
| 2010/0241277 | A1 | 9/2010 | Humphrey | |
| 2011/0204143 | A1* | 8/2011 | Mackenzie | E21B 17/006 235/385 |
| 2012/0061091 | A1* | 3/2012 | Radi | E21B 47/001 166/350 |
| 2013/0181829 | A1 | 7/2013 | Schnitz et al. | |
| 2019/0102664 | A1 | 4/2019 | Carr et al. | |
| 2020/0125910 | A1 | 4/2020 | Carr et al. | |

* cited by examiner

230 → device_record

| device_id | asset_id | serial_no | Manufacturer | Model | Activation year | Lat | Long | precision |
|---|---|---|---|---|---|---|---|---|
| SC471_42546 | | 6458944-1472 | Silicon Controls | SC471 | 2017 | 33.542618 | 150.872624 | 15 |

232 → asset_record

| device_id | asset_id | serial_no | Volume | Buildyear | Contents | lat | long | radius | vessel type | above ground |
|---|---|---|---|---|---|---|---|---|---|---|
| | ORI_2455142 | 5452385365 | 3000 | 2010 | LPG | 32.234645 | 151.246126 | 45 | Round | YES |

FIGURE 17

234 → device_record

| device_id | asset_id | serial_no | Manufacturer | Model | Activation year | Lat | Long | precision |
|---|---|---|---|---|---|---|---|---|
| SC471_42546 | ORI_2455142 | 6458944-1472 | Silicon Controls | SC471 | 2017 | 32.234645 | 151.246126 | 15 |

236 → asset_record

| device_id | asset_id | serial_no | Volume | Buildyear | Contents | lat | long | radius | vessel type | above ground |
|---|---|---|---|---|---|---|---|---|---|---|
| | ORI_2455142 | 5452385365 | 3000 | 2010 | LPG | 32.234645 | 151.246126 | 45 | Round | YES |

FIGURE 18

METHOD AND A SYSTEM FOR MONITORING A QUANTITY RELATED TO AN ASSET

CROSS REFERENCE TO RELATED APPLICATION

This application is a continuation of U.S. patent application Ser. No. 16/720,343 filed Dec. 19, 2019, which is a continuation of U.S. patent application Ser. No. 16/143,820 filed Sep. 27, 2018, now U.S. Pat. No. 10,552,721 issued Feb. 4, 2020, which claims priority to and the benefit of Australian Patent Application No. 2017903959 filed Sep. 29, 2017, which is incorporated herein by reference in its entirety.

TECHNICAL FIELD

The disclosure herein generally relates to monitoring a quantity related to an asset, and particularly but not exclusively to monitoring a quantity of fluid within a vessel.

BACKGROUND

Fuels that are gaseous at standard ambient temperature and pressure ("gas fuels") may comprise, for example, methane, ethane, propane, butane, pentane, and mixtures of two or more of these hydrocarbons. Gas fuels may be compressed to form a fluid in the form of liquefied gas fuel. For example, butane, propane, and fuels containing mixtures of these hydrocarbons may be sold as liquefied petroleum gas or liquid propane gas, either of which may be abbreviated as LPG. A liquefied gas fuel or other fluid may be stored in a vessel, examples of which include but are not limited to pressure vessels in the form of cylinders and tanks including LPG bulk storage vessels ("LPG bullet tanks"), and liquefied natural gas storage vessels. A vessel is a type of asset.

When a vessel is installed in the field, it is useful for a truck-based gas delivery business (or other truck-based fluid delivery business) to be able to remotely monitor the quantity of fluid in the vessel. Vessel fluid quantity information may assist a fluid supplier to avoid fluid "run-outs" i.e. letting the fluid quantity fall so low that the customer runs out of fluid. Fluid run-outs are very annoying for customers, and may even prompt them to switch to a different fluid supplier. Fluid quantity information also helps fluid suppliers to avoid delivering fluid before a vessel needs refilling. Delivering fluid before fluid quantities reach the re-fill quantity may result in trucks making more deliveries than necessary, which may waste both labour and truck fuel, and forces fluid suppliers to operate a larger truck fleet than necessary. Fluid delivery businesses, for example LPG gas delivery businesses, may have tens or hundreds of thousands of customers, so the cost of unnecessary deliveries can be significant for them.

A vessel may be fitted with a telemetry-enabled telemetric device capable of transmitting the fluid quantity information, which may be, for example, the output of a fluid quantity gauge. An example of a fluid quantity gauge is a float gauge located inside a LPG pressure vessel. The information transmitted by a telemetry-enabled telemetric device, for example, fluid quantity information, status reports, and alerts, is typically stored in an electronic database record. It may be necessary to link, relate, or "associate" the transmitted information with one or more other database records, for example a database record containing information about the vessel or a database record containing customer billing information. This association enables a delivery to be made on time to the correct vessel, and also enables the correct customer to be billed for that delivery.

In a computer database, the association can be implemented by manually associating an identifier from each of the two records, which allows the other information in those records to be associated (joined) in a relational database, for example. Therefore, a telemetry-enabled telemetric device identifier for the telemetric device may be associated in a computer database with a vessel identifier. The identifiers generally comprise a sequence of symbols that are each an alphanumeric symbol, and may be in the form of a serial code. Each vessel identifier for a collection of vessels may be unique, and each device identifier for a collection of devices may be unique. The identifiers may be printed on labels fixed to the telemetry-enabled telemetric device and vessels, for example. The vessel identifier for the gas vessel may comprise information that indicates a delivery point for gas deliveries.

Conventionally, a manual process is used to associate the telemetry-enabled telemetric device identifier with the vessel identifier. An installer may communicate by telephone the device identifier and vessel identifier to a person at the truck-based delivery company's office or depot.

The person manually enters the telemetry-enabled telemetric device identifier and vessel identifier into a database to make the association. Manual association of identifiers may be delayed or forgotten by the person doing it, which may delay the commissioning or billing related to the vessel and/or its fluid contents.

Further, there are a number of opportunities for human errors to occur when manually associating identifiers, including but not limited to:
  The telemetry-enabled telemetric device identifier may be misread or confused with other markings on the telemetry-enable device identifier, e.g. model number, asset tag.
  The telemetry-enabled telemetric monitoring device identifier may be recorded incorrectly in the database.
  An incorrect vessel identifier may be associated in the computer database with the telemetry-enabled telemetric monitoring device identifier, which may lead to incorrect customer being billed.
  Either an invalid vessel identifier or an invalid telemetry-enabled telemetric device identifier may be used, which may lead to no customer being billed at all.
  When a telemetry-enabled telemetric monitoring device identifier is pre-associated with the vessel identifier, an installer carrying multiple devices may install a telemetry-enabled telemetric device on the wrong vessel.

An incorrect association of identifiers may be a serious issue for suppliers and consumers of delivered fluids, for example LPG gas and oil. It may result in incorrect fluid quantity information for a vessel, which may cause run-outs. It may also cause the wrong consumers being billed for gas/oil usage.

Mistakes may inconvenience consumers, which may cause them to switch to another supplier, which is a loss of revenue for the supplier. Further, each incorrect device-to-vessel or other type of asset association needs to be investigated and rectified by the supplier (which may require a visit to the telemetric device in the field) which wastes time and money. Even a small number of incorrect device-to-vessel associations may be costly for a supplier. An error rate of only 1% in a roll-out of 50,000 telemetric monitoring devices will result in 500 incorrect device-to-vessel associations, which is a major source of expense to a supplier.

SUMMARY

It is an object of the disclosed methods and devices to at least partially ameliorate problems described above, and others where possible.

Disclosed are systems and methods for automatically changing an unassociated telemetric device into an associated telemetric device. There are at least two situations an unassociated telemetric device can become an associated telemetric device.

In a first situation, a device may be installed for use on a vessel in a depot where, for example, a distributor may house and/or maintain a stock of vessels. In that case, a commercial operator may store a vessel and then deliver it to a customer at the vessel's deployment location. Prior to delivery at the deployment location, a device may be installed on a vessel. The vessel may therefore be transported with the device already installed.

During transport the device may either be in a state of sleep wherein a state of switched off the power to the radio module and/or any other functions of the device reduces the power consumption of the telemetric fitting electronics, which may generally extend the life of the at least one battery. However, during transport, the device may not be asleep due to any number of circumstances. For example, after installation at the depot, the device may have been awakened but not returned to its sleep state. Therefore, during transport, the device may be awake and polling the GNSS chip for its location, and processor may cause the radio transmitter to transmit the location of the device during transit. However, a remote server determining the location information from a device which is not in its deployment location, but for example close to another deployment location, the device could be paired to the wrong deployment location, and thus become an associated telemetric device, but associated incorrectly. It is desirable to avoid correlating a telemetric device to the wrong deployment location.

In another situation, a vessel may already be located at a deployment location but may not have already, a device installed on the vessel. Or in another situation at the deployment location, there is a device on or incorporated into the vessel but for some reason the device needs replacing. It is understood that a device on a vessel may include any type of installation, for example, where a device is within a vessel, or otherwise incorporated with the vessel.

Disclosed herein is a method and a system for automatically electronically associating a vessel's or asset's identity information and with an unassociated telemetric device, the unassociated telemetric device comprising a processor and being configured to detect and transmit of quantity or usage and being configured with a location sensing device, wherein the unassociated telemetric device is configured to communicate with a remote server, the method comprising the steps of: the remote server receiving the vessel identity information comprising a deployment location for the unassociated telemetric device; the unassociated telemetric device operating in accordance with an automatic action rule; in response to the unassociated telemetric device operating in accordance with the automatic action rule, the processor receiving the unassociated telemetric device location information from the location sensing device; the unassociated telemetric device transmitting the unassociated telemetric device location information; the remote server receiving the unassociated telemetric device location information; the remote server correlating the unassociated telemetric device location information with the vessel identity information when resolving that the unassociated telemetric device location information represents that the unassociated telemetric device is within a proximity to the deployment location, and the remote server automatically electronically associating the unassociated telemetric device with the vessel identity information, resulting in the unassociated telemetric device becoming an associated telemetric device, so that when the associated telemetric device generates quantity or usage information, the quantity or usage information transmitted by the associated telemetric device is applied to a data store of the remote server related to the vessel identity information.

Also disclosed herein is a method for monitoring a quantity of fluid within a vessel. The method comprises the steps of:

receiving telemetric device location information indicative of the location of a telemetric device, the telemetric device being for transmission of fluid quantity information indicative of the quantity of fluid within the vessel;

determining, using the telemetric device location information and stored target location information indicative of a target location, whether the telemetric device is located at the target location, and if so determined, electronically associating information related to the telemetric device with information related to the vessel.

An embodiment comprises the step of determining whether the telemetric device is not located at the location of the vessel using the vessel location information and the telemetric device location information, and if so determined stop electronically associating fluid quantity information generated by the telemetric device with the vessel.

An embodiment comprises the step of determining, using the telemetric device location information and the target location information, whether the telemetric device is not located at the target location, and if so determined, stop electronically associating information related to the telemetric device with information related to the vessel.

In an embodiment, the target location information defines a geographical boundary, and the step of determining whether the telemetric device is located at the target location comprises determining whether the telemetric device is within the geographical boundary.

In an embodiment, the geographical boundary surrounds only one vessel for which the quantity of fluid within the vessel is being monitored with the telemetric device.

In an embodiment, the step of determining whether the telemetric device is located at the target location comprises the step of determining whether the geographical boundary overlaps with a plurality of other geographical boundaries for a plurality of other vessels being monitored for fluid quantity therein by a plurality of other telemetric devices.

In an embodiment, the target location information defines a first geographical boundary and the telemetric device location information defines a second geographical boundary, and the step of determining whether the telemetric device is located at the target location comprises determining whether the second geographic boundary overlaps the first geographical boundary according to a predefined rule.

In an embodiment, the information related to the telemetric device comprises a geographical location computer database record comprising a location of the vessel.

In an embodiment, the information related to the telemetric device comprises a telemetric device identity computer database record comprising telemetric device identity information.

In an embodiment, the information related to the vessel comprises a vessel identity computer database record comprising vessel identity information.

In an embodiment, the information related to the telemetric device comprises a telemetric device identity computer database record comprising telemetric device identity information, and comprising the step of determining, using the target location information and the telemetric device location information, whether the telemetric device is not located at the target location, and if so determined, disassociating the telemetric device identity record from the vessel identity record.

In an embodiment, the information related to the telemetric device is associated with information related to the vessel when the location of the telemetric device is determined using telemetric device location information generated by at least one of the telemetric device and another telemetric device, the telemetric device location information being indicative of the location of one of the telemetric device and the other telemetric device.

An embodiment comprises the step of operating the telemetric device in accordance with a rule.

In an embodiment, the transmission comprises wireless transmission at radio frequencies.

Disclosed herein is a method for monitoring a quantity related to an asset. The method comprises the steps of:

receiving telemetric device location information indicative of the location of a telemetric device for transmission of quantity information indicative of the quantity;

determining whether the telemetric device is located at a target location using target location information and the telemetric device location information, and if so determined, electronically associating information related to the telemetric device with information related to the asset.

In an embodiment, the quantity comprises at least one of a quantity of a commodity, a quantity of gas, a quantity of electrical power, a quantity of a water, and a quantity of oil.

In an embodiment, the quantity comprises at least one of a physical quantity, a vibration quantity in a structure, and a strain quantity in a structure.

In an embodiment, the asset comprises at least one of a gas vessel, an oil vessel, a water vessel, a power pole, a manifolded gas pack, a portable building, a portable plant, and a portable piece of equipment.

In an embodiment, the target location is a deployment location for the asset.

Disclosed herein is a system for monitoring a quantity of fluid within a vessel. The system comprises:

a telemetric device configured to transmit telemetric device location information indicative of the location of the telemetric device and transmit fluid quantity information indicative of the quantity of fluid within the vessel;

a processor configured to receive the telemetric device location information, determine whether the telemetric device is located at a target location using the telemetric device location information and target location information indicative of the target location, and if so determined, electronically associate information related to the telemetric device with information related to the vessel.

In an embodiment, the telemetric device is configured to wirelessly transmit at radio frequencies the telemetric device location information and the fluid quantity information.

In an embodiment, the processor comprises an electronic data store in which the information related to the telemetric device is electronically associated with the vessel.

In an embodiment, the telemetric device is configured to generate the telemetric device location information.

An embodiment is configured to locate the telemetric device using radio triangulation.

In an embodiment, the telemetric device comprises a fluid quantity sensor.

Disclosed herein is a system for monitoring a quantity related to an asset. The system comprises:

a telemetric device configured to transmit telemetric device location information indicative of the location of the telemetric device and transmit quantity information indicative of the quantity;

a processor configured to receive the telemetric device location information, determine whether the telemetric device is located at a target location using the telemetric device location information and target location information indicative of the target location, and if so determined, electronically associate information related to the telemetric device with information related to the asset.

Disclosed herein is a processor for monitoring a quantity related to an asset. The processor is configured to receive telemetric device location information from a telemetric device configured to transmit telemetric device location information indicative of the location of the telemetric device and transmit quantity information indicative of the quantity, determine whether the telemetric device is located at a target location using the telemetric device location information and target location information indicative of the target location, and if so determined, electronically associate information related to the telemetric device with information related to the asset.

An embodiment is configured to transmit telemetric device location information indicative of the location of the telemetric device and transmit quantity information indicative of the quantity.

Disclosed herein is a method for electronically associating, in a computer database, a first database record with a second database record. The second database record comprises information related to a telemetric device. The method comprises the steps of:

receiving telemetric device location information indicative of a location of the telemetric device;

determining whether the telemetric device is located at a target location, and if so determined, electronically associating the first database record with the second database record.

An embodiment comprises the step of determining whether the telemetric device is not located at the target location, and if so determined, disassociating the first database record from the second database record.

In an embodiment, the step of determining whether the telemetric device is located at the target location comprises comparing the telemetric device location information with stored target location information indicative of the target location.

In an embodiment, the step of determining whether the telemetric device is located at the target location comprises:

comparing the telemetric device location information with stored target location information indicative of the target location, the target location information defining a target geographical boundary determining whether the telemetric device is within the target geographical boundary.

In an embodiment, the step of determining whether the telemetric device is located at the target location comprises:

comparing the telemetric device location information with stored target location information indicative of the target location, the target location information defining a first geographical boundary, the telemetric device information defining a second geographical boundary determining whether the second geographic boundary overlaps the first geographical boundary according to a predefined rule.

In an embodiment, the step of comparing the telemetric device location information with stored target location information is performed electronically.

In an embodiment, the telemetric device location information is received through wireless transmission at radio frequencies.

In an embodiment, the first database record comprises information related to an asset.

In an embodiment, the first database record comprises information related to a deployment location of an asset.

In an embodiment, the telemetric device is arranged to monitor a quantity related to an asset and to transmit quantity information indicative of the quantity.

In an embodiment, the asset comprises a vessel for holding a fluid.

Any of the various features of each of the above disclosures, and of the various features of the embodiments described below, can be combined as suitable and desired.

Any of the various features of each of the above disclosures, and of the various features of the embodiments described below, can be combined as suitable and desired.

BRIEF DESCRIPTION OF THE DRAWINGS

Embodiments will now be described by way of example only with reference to the accompanying figures in which:

FIGS. 17 to 18 show an example of tables of information in an SQL database.

DETAILED DESCRIPTION OF THE EMBODIMENTS

Figure 1:
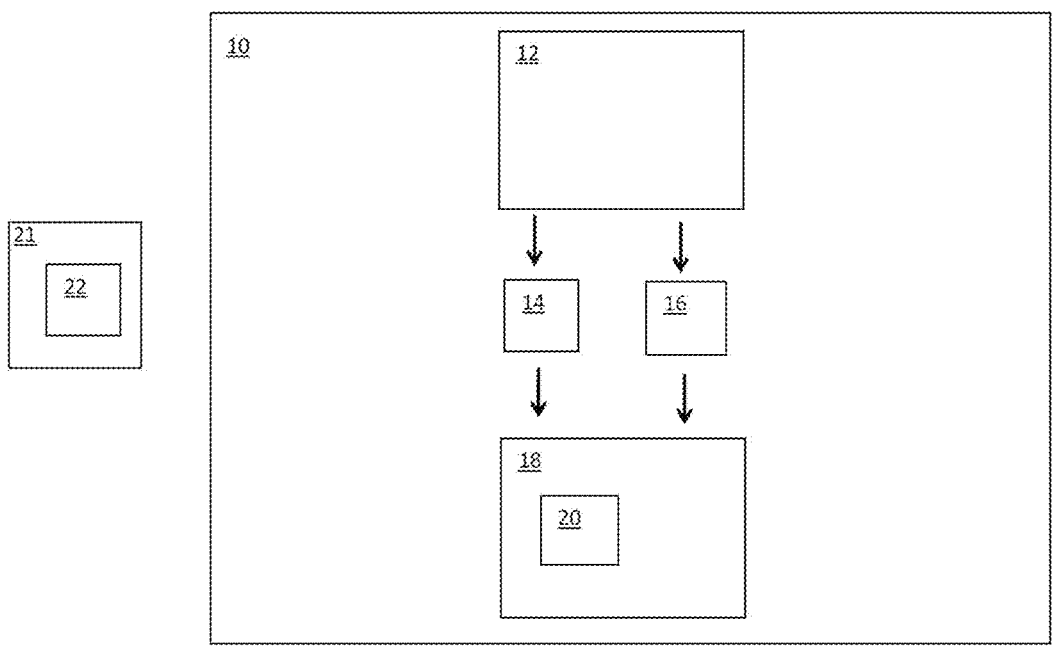
FIG. 1 shows a block diagram of an embodiment of a system for monitoring a quantity related to an asset.

FIG. 1 shows a block diagram of an embodiment of a system for monitoring a quantity related to an asset. The system is generally indicated by the numeral 10. The system 10 comprises a telemetric device 12 configured to transmit telemetric device location information 14 indicative of the location of the telemetric device and to transmit quantity information 16 indicative of the quantity. The system 10 comprises a first unassociated telemetric device 12 and a remote server or other device such as a mobile device 18. The unassociated telemetric device is configured with a location sensing device such as a GNSS device, and a contents and/or usage sensing device for sensing the contents or usage of contents of an asset. The asset, for example, may be a vessel. The vessel, tank or asset described herein is a vessel in the form of a LPG bulk storage tank of FIG. 1, but the vessel may alternatively be any of a cylinder or a tank for any suitable fluid, solids, gas or any type of product, examples of which include liquefied gas fuel, liquefied ammonia, cryogenic liquids including liquefied natural gas and liquefied permanent gases, water, solutions, liquid chemicals, and refined petroleum products including petrol, kerosene, and fuel oil. Furthermore, the tank can be more generally referred to as an asset, wherein the asset can be, for example, any fuel handling, storage systems or any commodities distribution enclosure. While a magnetically enabled float gauge fuel-level sensor system is typically used in an LPG or oil tank, it is understood that a product-level sensing device can be enabled by any type of technology, for example, ultra-sound/ultrasonic, optical, pressure, ammeters, voltmeters, weight, laser, microwave and any other type of sensor system and any product-level detection is within the scope of this discussion. In another embodiment, the telemetric electronic device 12 may be incorporated into the asset as a part of the asset, in any suitable manner.

The remote server includes at least one processor 18 configured to receive the unassociated telemetric device location information 14 based upon GNSS device data of the unassociated telemetric device 12 and can receive the quantity information 16 based upon sensor device data of the associated telemetric device 12 when so transmitted. Other remoted device configurations are within the scope of this discussion.

In one scenario, the vessel is delivered within the target location 21 with a pre-installed unassociated device 12. In another scenario, the vessel is already at the deployment location 22 within the target location 21 and the unassociated device 12 is thereafter installed for use in conjunction with the vessel. Therefore, the vessel may be at deployed at a location 22 within a target location 21, with or without the device 12. The target location may be described as geographical boundary of any suitable dimensions.

In any event, the system 10 can determine whether the unassociated telemetric device 12 is located at a target location 21 (in the vicinity of where an asset 22 is deployed) using the unassociated telemetric device location information 14. Because a location device of the unassociated device 12 may be a GNSS, activation of the GNSS may be performed on a limited basis, as such GNSS devices draw substantial power from the device's battery. The housing of the device may be sealed to maintain its integrity in adverse weather conditions, so therefore, when the batteries are depleted, the device may be need to be replaced. Therefore, drain on the battery may be avoided by transmitting location information 16 on a limited basis. The trigger for the unassociated telemetric device 12 to activate the location device may be when the device operates in accordance with an automatic action rule.

When the unassociated telemetric device location information 14 is so transmitted, it can be determined or resolved whether the telemetric device 12 is located at a target location 21 (in the vicinity or proximity to where an asset 22 is deployed). Using the unassociated telemetric device location information 14 and target location information 20 indicative of the deployment location of the asset, and if it is so determined or resolved that the device's 12 is within the to the target location 21 or otherwise proximal to the asset's deployment location, fully or partially (within tolerances such the boundary dimension for the telemetric device as described), then the system can electronically associate the unassociated telemetric device with the asset identity information. In this way, quantity or usage information transmission output of the associated telemetric device can be applied to a data store of the remote service related to the asset identity information as the now the output of the associated telemetric device 12 is correlated with information related to the asset 22.

The device deployment location may be received at a remote location and/or server, may be combined with a perimeter boundary which enlarges the area around the device's deployment location. The accuracy of the location information provided by various commercially available chipsets typically has a tolerance associated with it and may be used to define perimeter boundary. Other parameters may be used to define the perimeter boundary, alternatively or as well. The perimeter boundary superimposed upon the deployment location information received from the device 30, for example, may exceed the tolerance. For example, the perimeter boundary superimposed upon the location information may have a radius of 10 meters, and therefore a boundary dimension may be applied to the device location information to enlarge the device location information. The enlarged device location information may overlap the target location information (which may be superimposed over the deployment location) when the remote server compares the determined location information with the target location information.

The system 10 is configured to perform a method for monitoring a quantity related to an asset. A step of the method comprises receiving telemetric device location information 14 indicative of the location of a telemetric device for transmission of quantity information 16 indicative of the quantity. A step of the method comprises determining whether the telemetric device 12 is located at a target location 21 (where an asset 22 is deployed) using target location information and the telemetric device location information 14, and if so determined, electronically associating information related to the telemetric device 12 with information related to the asset 22. The processor may comprise a computer program, which when executed by the processor causes the processor to perform the embodiment disclosed above.

This but not all embodiments of the system 10 is for monitoring a level of fluid within a vessel, however it will be appreciated the other embodiments may be for monitoring generally any suitable quantity related to any suitable asset. In this embodiment, the asset is a vessel and the quantity is the level of fluid within the vessel. However, other examples of an asset include:
 a gas vessel, oil vessel, or water vessel;
 a power pole;
 a gas meter or electrical meter;
 a manifolded gas pack;
 a portable building;
 portable plant or equipment.

In at least some embodiments, the asset is stationary in use but capable of being transported to an installation site.

Figure 2:
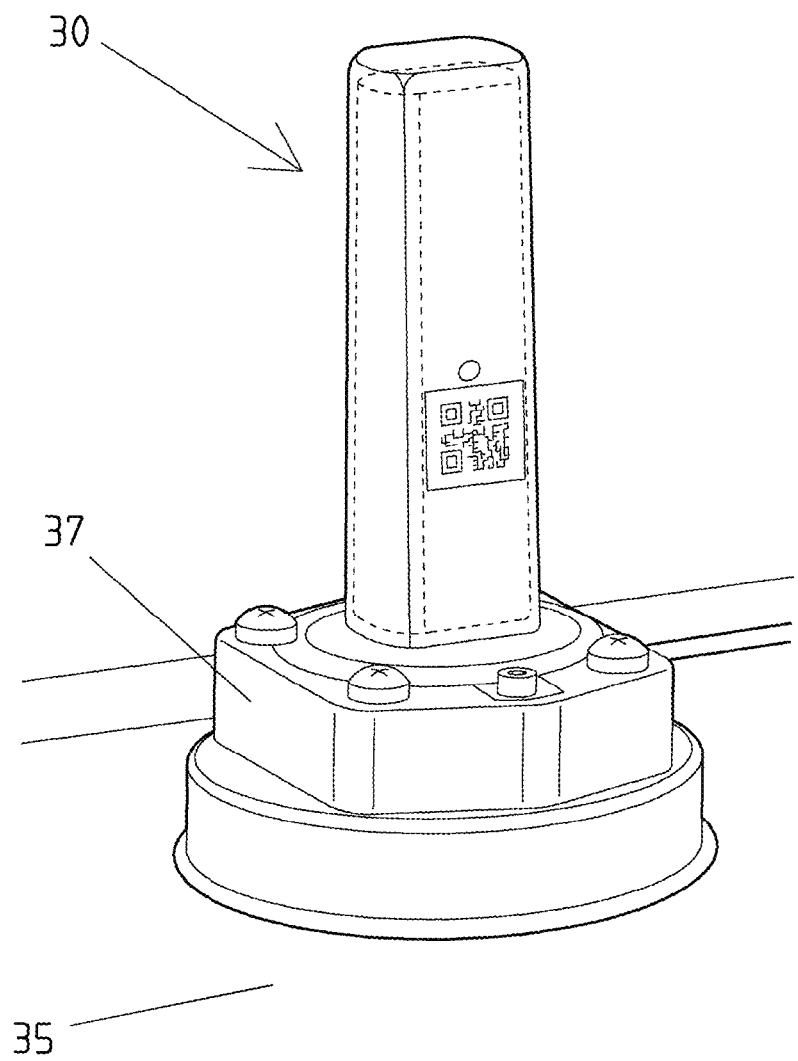
FIGS. 2 to 12 show an embodiment of a telemetric device for monitoring a quantity related to an asset.

FIG. 2 shows a perspective view of an embodiment of a telemetric device in the form of a telemetric fitting 30 for an asset in the form of a vessel 35 for holding liquefied gas. The telemetric fitting 30 is configured to derive liquid-level information when fitted to a liquid-level gauge 37 on the vessel 35, and to wirelessly transmit at radio frequencies the liquid-level information.

In the example shown in FIG. 2, the vessel is a pressure vessel in the form of a liquefied gas fuel pressure storage vessel, specifically an LPG bulk storage pressure vessel, however the vessel may be any suitable pressurized or non-pressurized vessel, examples of which include a LPG cylinder, a cryogenic vessel for a permanent gas, liquefied natural gas or other fluid, an ammonia storage vessel, and a refined petroleum product storage vessel for example. The liquid level gauge 37 encloses a drive magnet connected to a float-arm gauge inside the vessel, and the drive magnet rotates in response to changes in liquid level inside the vessel. However, generally any suitable liquid-level gauge may be used.

Figure 3:
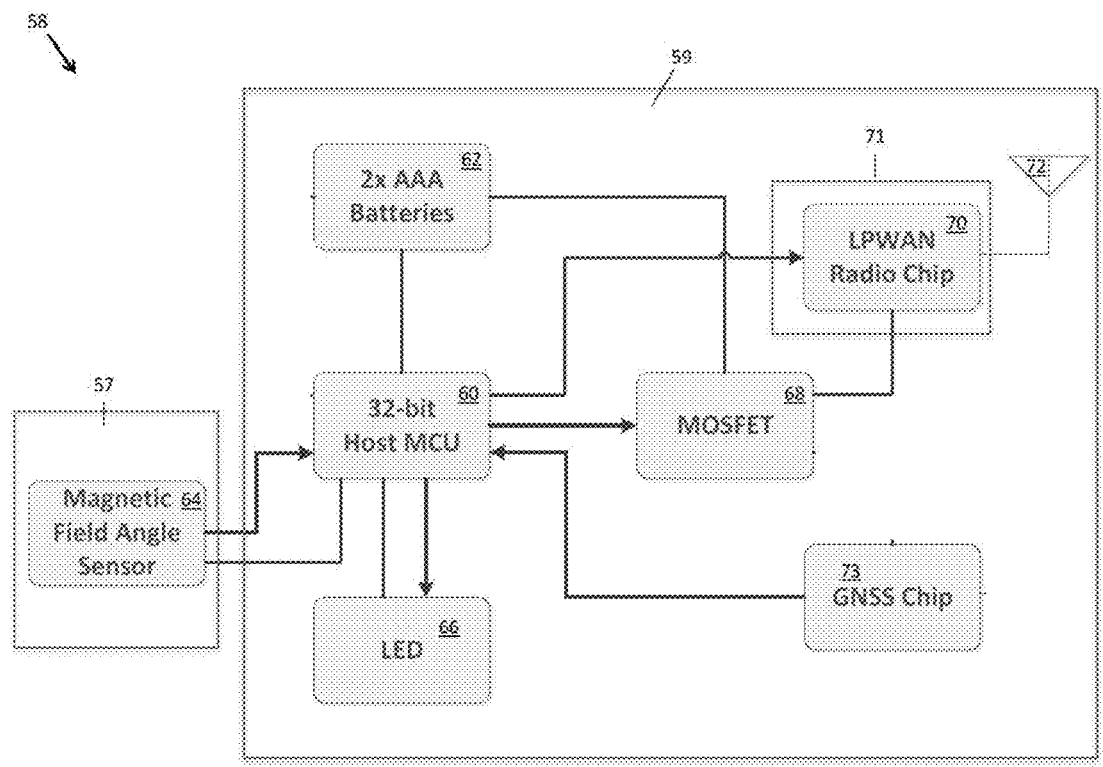

FIG. 3 shows a block diagram of telemetric fitting electronics 58. Connecting lines with arrows are information conduits, and connecting lines without arrows are power conduits. The electronics comprises at least one printed circuit board assembly (PCBA) 57, 59. The electronics 58 comprises a plurality of electrical components, at least some of which are mounted on a printed circuit board of the at least one PCBA 57, 59. The plurality of electrical components comprise at least one of a processor 60 in the form of a logic device, in this embodiment a host microcontroller unit 60, an electronic magnetic sensor 64 in the form of an electronic magnetic field angle sensor (which is analogue, however it may alternatively be digital), a location sensing device such as a GNSS chip 73, and a radio 71 in the form of a radio transceiver, the radio comprising at least one of a medium range radio network interface and a long range radio network interface, an antenna 72, and a power switch in the form of a MOSFET 68, indicator lights in the form of at least one LED 66, and an electrical power source in the form of at least one battery 62 that provides power to the radio 71 via the MOSFET 68 and the logic device 60. The processor 60 is in electrical communication with the MOSFET 68. The MOSFET 68 and the processor 60 cooperate to switch off the power to the radio 71 when it is not transmitting the liquid-level information.

Another form of switch, for example a relay, may be used instead. The radio 71 is within a module, which may consume more power than desired, even when not transmitting. Switching off the power to the radio module and/or any other functions of the device reduces the power consumption of the telemetric fitting electronics 58, which may generally extends the life of the at least one battery 62 to, for example, 15 years. In an alternative embodiment, the electrical power source comprises an energy harvesting system that harvest mechanical energy (e.g. vibrations), electromagnetic energy (e.g. radio waves, light), or heat. For example, the energy harvesting system may comprise a solar cell, or piezoelectric generator.

Medium-to-long range wireless links enables transmission to centralized data centers, for example, using either private or commercial radio base stations.

In this embodiment, the radio network interface comprises a low power wide area network (LPWAN) interface. The LPWAN interface comprises an LPWAN integrated circuit 70. The LPWAN interface comprises a physical LPWAN interface in communication with the antenna 72. LPWAN is a type of wireless communications network for medium to long range communications at generally, but not necessarily, low bit rates and has low power consumption when compared to cellular communication technologies for voice and high bandwidth data services. Examples of LPWAN include but are not limited to LoRa, and SIGFOX. The LPWAN radio integrated circuit may be within a LPWAN radio module. Alternative embodiments may have a radio 71 comprising another type of medium range radio network interface or long range radio network interface, for example a cellular radio network interface (examples of which include but are not limited to GSM, CDMA, and LTE cellular radio network interfaces), IEEE 802.11 interface ("Wi-Fi") and a satellite communications interface.

The electronic magnetic field angle sensor 64 may not be sensitive to ambient temperature changes, as magnetic field strength sensors generally are. Consequently, the use of an electronic magnetic field angle sensor 64 may increase accuracy. In alternative embodiments, however, the strength of the magnetic field may be sensed for deriving the liquid-level measurement.

Figure 4:
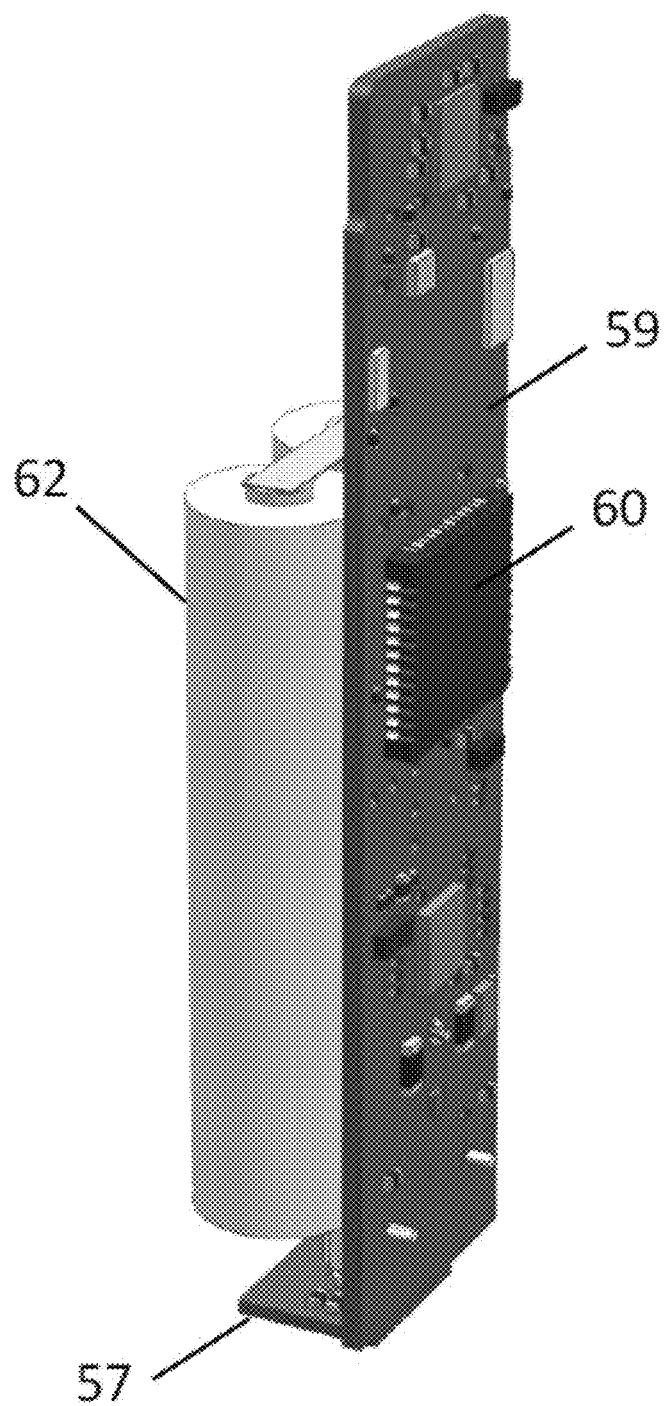
Figure 5:
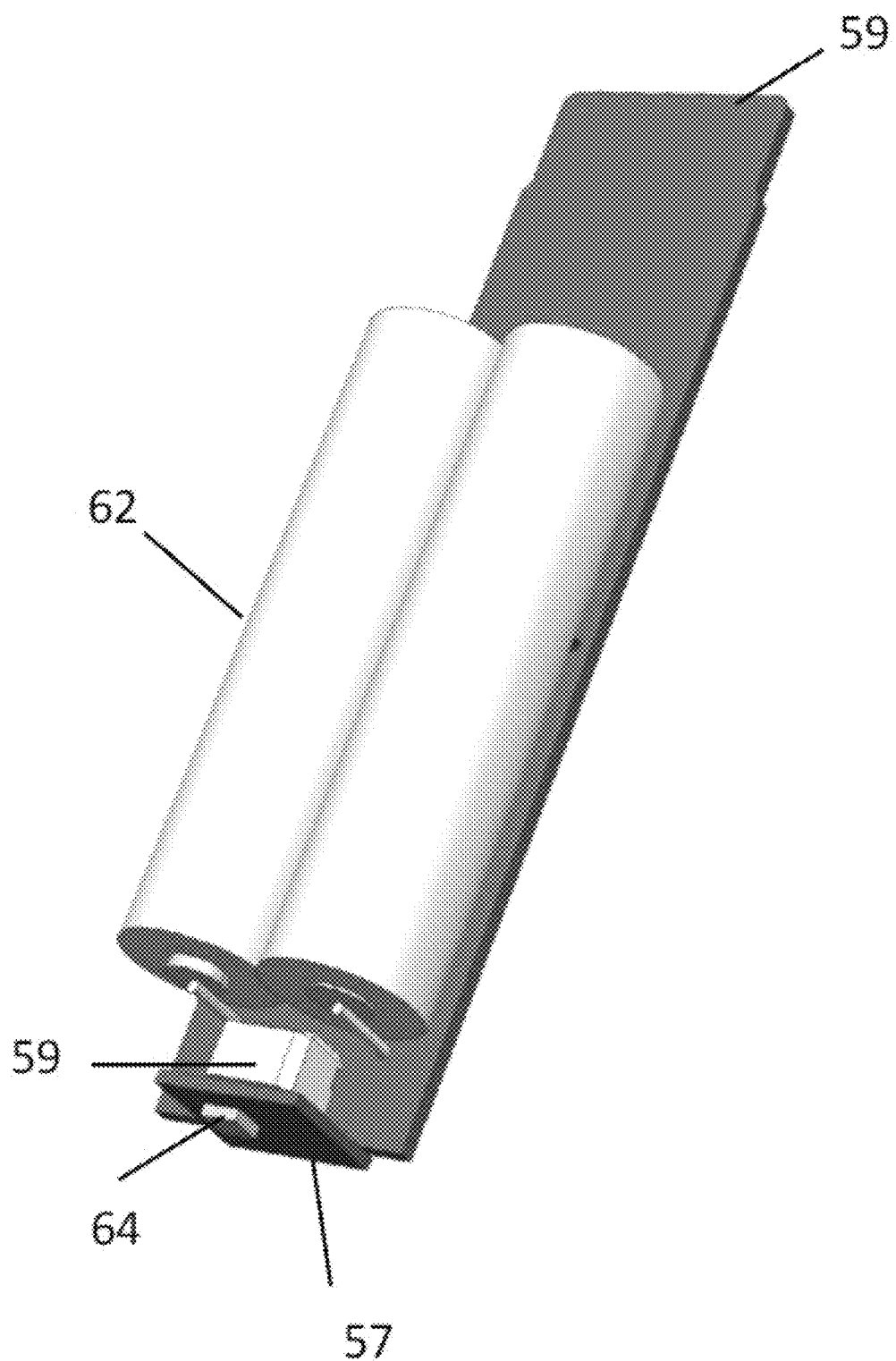
Figure 6:
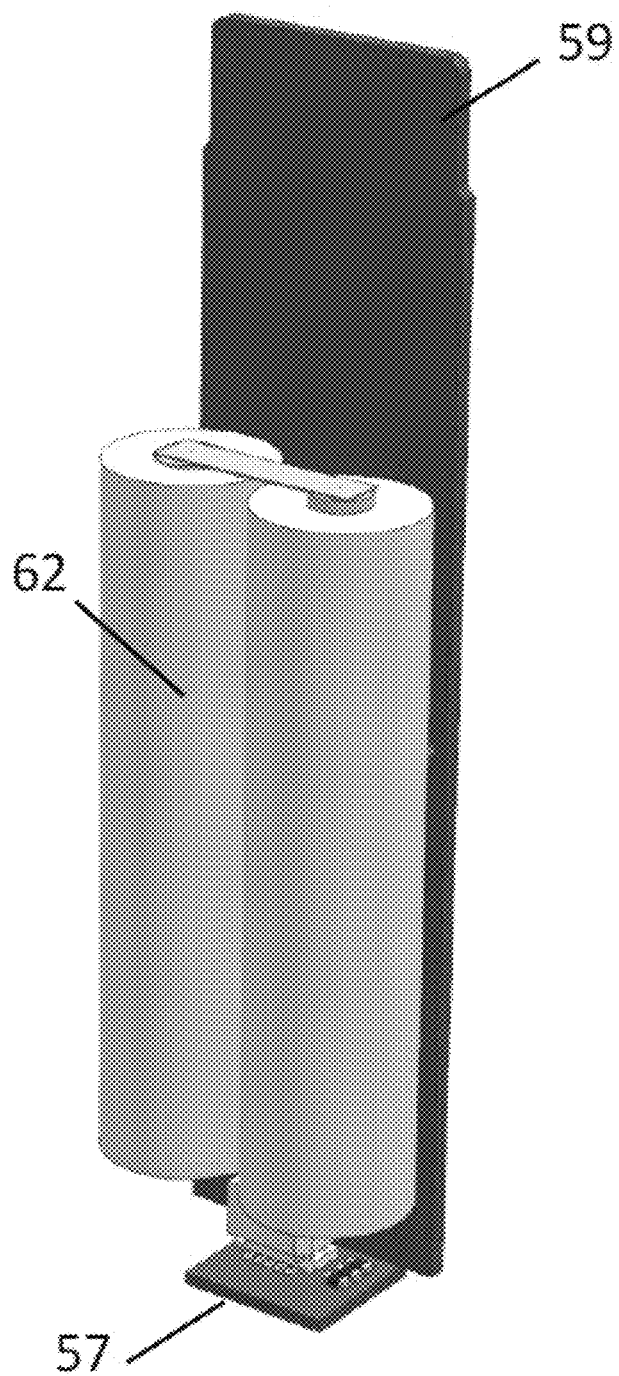

FIGS. 4-6 show perspective views of the PCBAs 57 and 59 which are orthogonal to each other and are joined using a board-to-board connector in the form of a header.

Figure 7:
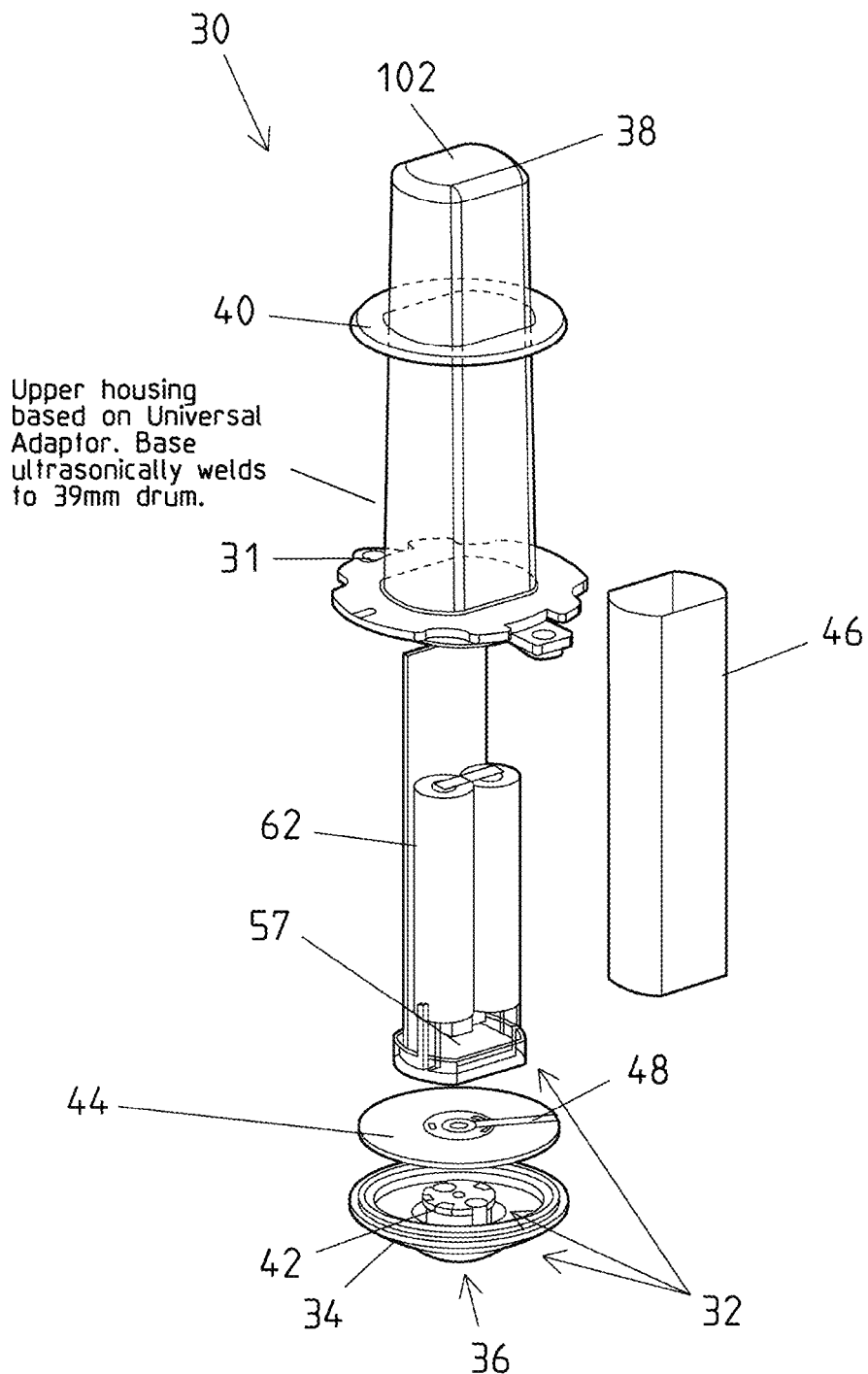
Figure 8:
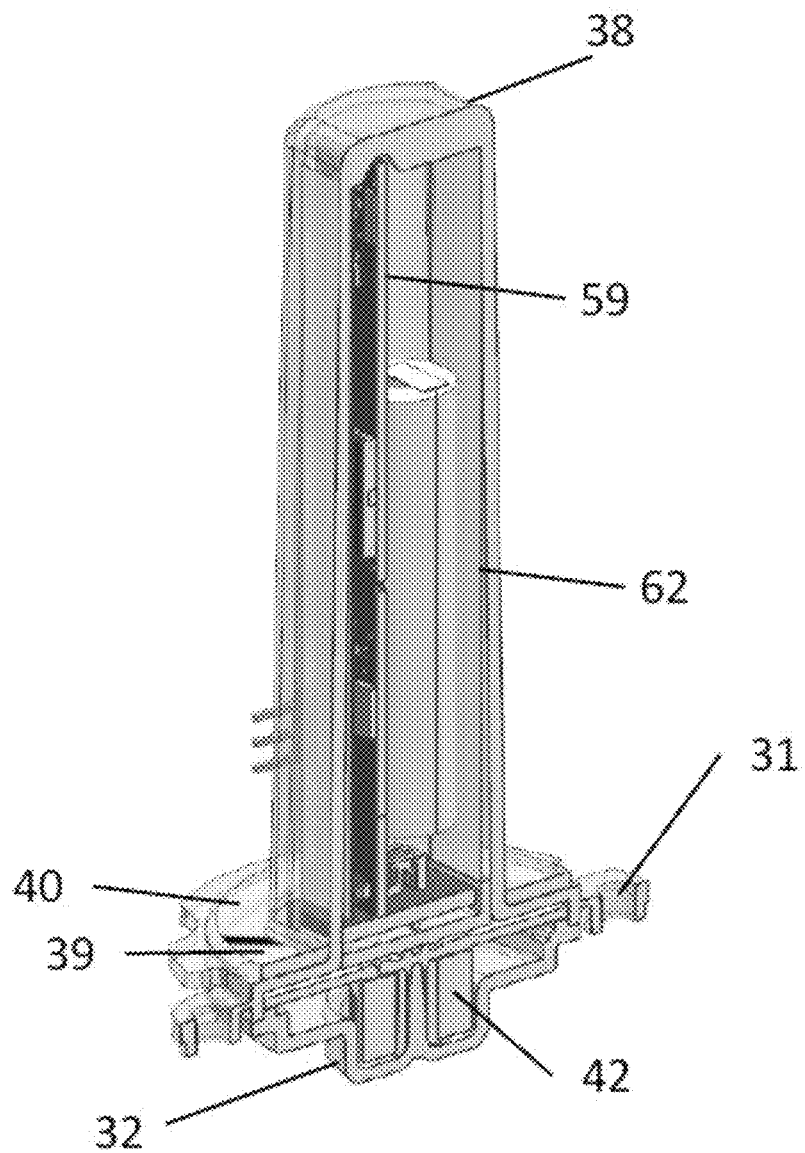

FIGS. 7 and 8 show an exploded perspective view and a cutaway view of the telemetric fitting 30 respectively. The telemetric fitting 30 has a gauge interface 32 at an end 36 of opposite ends 36, 102 thereof. The gauge interface 32 is configured to derive liquid-level information from the liquid-level gauge 37, for example in this embodiment from the liquid-level dependent magnetic field generated by the liquid-level gauge. The telemetric fitting 30 is configured such that the magnetic field generated by the drive magnet in the liquid-level gauge rotates around a longitudinal axis thereof. The magnetic field generated by the liquid-level gauge may be sensed directly by the electronic magnetic sensor 64. In this embodiment, however, at least one ferromagnetic element 42, 43 (two in the present embodiment, however other embodiments may have more or less) follows the magnetic field of the drive magnet, and the magnetic field of the ferromagnetic element 42 is sensed by the electronic magnetic sensor 64.

Figure 11:
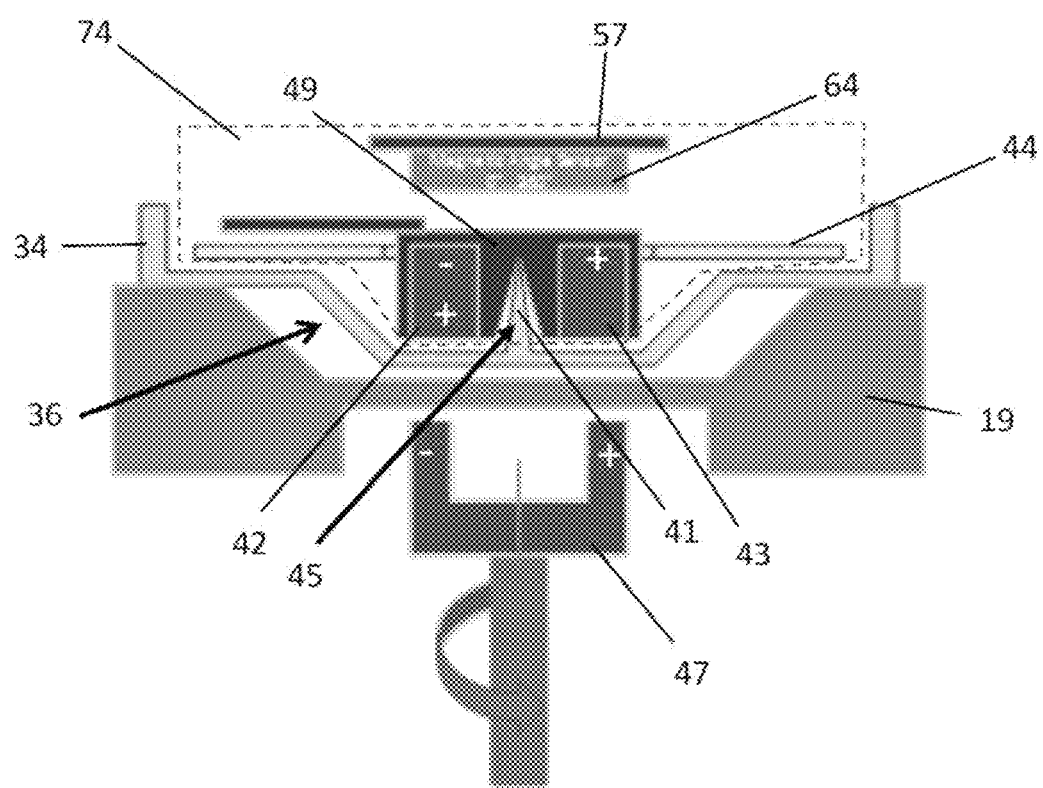
Figure 12:
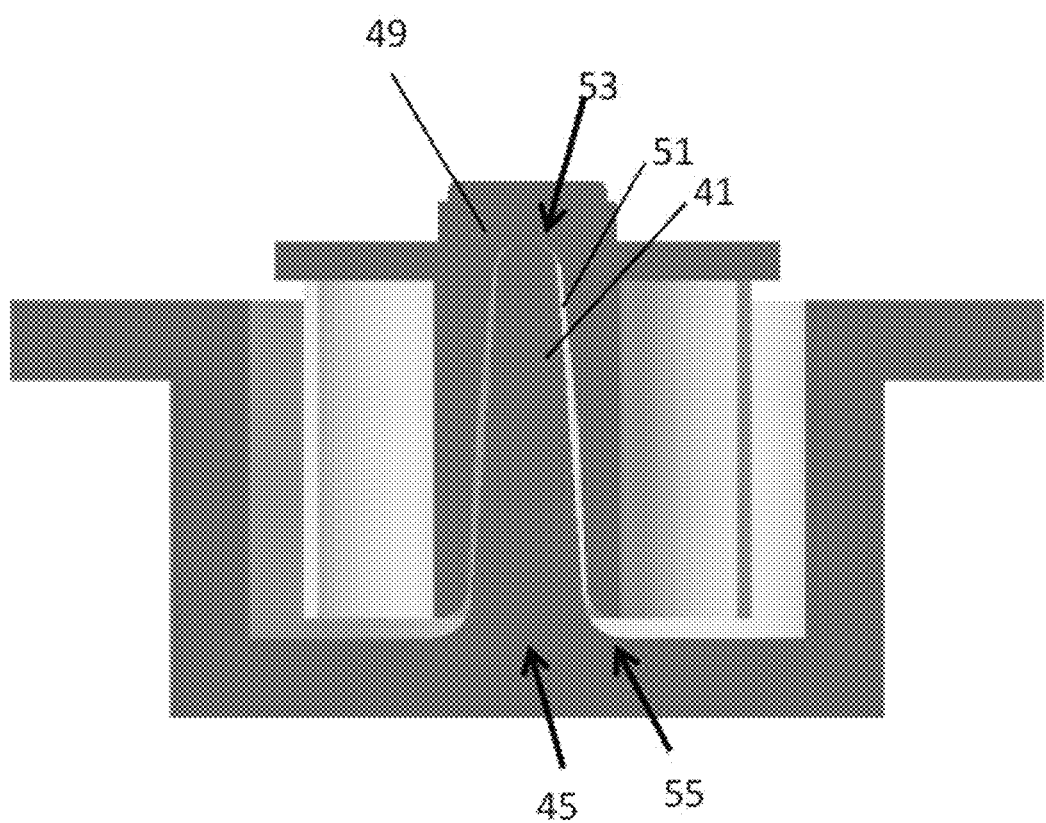

FIG. 11 shows a cross-sectional view of the liquid-level sensor head 19, drive magnet 47 and ferromagnetic element 42, 43. The ferromagnetic element 42, 43 and the electronic magnetic sensor 64 are parts of a magnetic sensor shown approximately in FIG. 11, with a more accurate detail thereof shown in FIG. 12 without magnets. In use, the magnetic sensor 64 is magnetically coupled to the magnetic field generated by drive magnet 47 within the liquid-level sensor head 19. The at least one ferromagnetic element 42, 43 is intermediate the end 36 and the sensor 64 and the PCBA 57. The magnetic sensor senses the orientation of the magnetic field generated by the liquid level gauge, which is dependent on the liquid-level within the vessel.

The magnet 42 is in this embodiment is one of two magnets 42, 43 arranged symmetrically around a central axis and held by a ferromagnetic element holder 49 in the form of a magnet holder. The magnet holder 49 is supported by a journal 41 to form a rotary bearing assembly 45 for rotation of the magnetic holder 49 around the longitudinal axis, enabling the at least one ferromagnetic element 42, 43 to rotate with the liquid-level dependent magnetic field. A bearing surface 51 within the magnetic holder receives the journal 41. The journal 41 is in the form of a peg or spigot, which in this but not all embodiments is integral with the end 36. The journal 41 penetrates more than half way through the magnetic holder 49, which may provide superior balance. The bearing assembly 45 comprises a first bearing component 53 in the form of a thrust bearing at the tip of the journal 41 for supporting the magnet holder 49, and a second bearing component in the form of a radial bearing 55 for orientating the magnet holder 49 to the central axis, especially when one magnet is misaligned or has a magnetic strength that is not equal to the other magnet. The magnet holder 49 is held down on the journal 41 by the magnetic attraction of the at least one magnet 42, 43 to the drive magnet 47 within the liquid-level sensor head 19, which generally but not necessarily removes the need for a second journal engaged with the other side of the magnetic holder.

The journal and the bearing surface comprise dissimilar materials for a low coefficient of friction. The materials are selected for a low coefficient of friction to maximize the bearing performance. In this embodiment, the journal is polycarbonate and the magnet holder is PolyOxyMethylene ("ACETAL"), however any suitable materials may be used.

The magnets 42, 43 have opposite magnetic orientation. Since like poles repel and opposite poles attract, this ensures that the correct magnets 42, 43 are correctly matched to the arms of the arms of the shaped drive magnet 47 in the liquid-level sensor head 19, which generates the liquid-level dependent magnetic field. Without the opposite magnetic orientations, it is possible for the magnets to be 180 degrees in error, which may result in a spurious reading.

The microcontroller unit 60 (indicated in FIGS. 3 and 4) receives raw magnetic field information in the form of magnetic field orientation information generated by the magnetic sensor, in this embodiment from an output of the electronic magnetic sensor 64 shown in FIG. 11. The magnetic field orientation information comprises three voltages from three arms of a bridge within the sensor 64. The microcontroller executes a program that comprises an algorithm specified by the sensor manufacturer for calculating magnetic field orientation information indicative of an angle of the magnetic field from the received raw magnetic field information. The magnetic field orientation information is indicative of the liquid-level. The magnetic field orientation information comprises a string of symbols that encode an angle for the orientation of the magnetic field. The microcontroller 60 sends the magnetic field orientation information to the radio for transmission of the liquid level information. The radio encapsulates the string of symbols in accordance with the LPWAN protocol and subsequently sends the encapsulated string of symbols, optionally together with telemetric fixture identification information indicative of the identification of the telemetric fixture. The LPWAN protocol may include identification information, for example a SigFox DeviceID or LoRaWAN end-device address. The magnetic field orientation information is received by a computer server that can access information on the type of gauge that the telemetric unit 30 is attached to and thus calculate using the magnetic field orientation information the liquid-level in a percentage of total vessel water volume or generally any suitable other unit, for example volume of remaining liquid in the vessel. The computer server has a data store in the form of a database that associates the identification information of a plurality of telemetric fixtures to information about the gauge and/or vessel to which they are each attached. The database may be populated by keyboard entry, for example.

In an alternative embodiment, the microcontroller unit 60 has a lookup table stored in memory associating the sensed magnetic field angle with liquid-level information. Generally, any suitable algorithm may be used to derive the liquid-level information from the magnetic field information generated by the magnetic sensor. In this but not all embodiments, the liquid-level information comprises a string of symbols that encode the remaining volume of liquid as a percentage. The microcontroller determines the liquid-level information from the lookup table and subsequently sends the liquid level information to the radio for transmission, of the liquid level information. The radio encapsulates the string of symbols in accordance with the LPWAN protocol and subsequently sends the encapsulated string of symbols, together with telemetric fixture identification information indicative of the identification of the telemetric fixture.

Coupled to the ferromagnetic element 42 is an indicator 44 in the form of a disk having an index mark or pointer 48. The index mark or pointer may be pad printed, a label attached with adhesive, or otherwise formed or made for example by laser machining. The indicator 44 is attached via a clip to the magnet holder and rotates with the ferromagnetic element. The telemetric fitting 30 comprises a two-part transparent exterior housing 38, made of impact resistant polycarbonate, in which is disposed electronics 58. The polycarbonate has a transparent window 39 at the end 36 for viewing the indicator 44 in the form of the disk from above. The dial 40 is also transparent.

A human readable dial 40 is attached to the exterior housing 38. The dial is attached the housing adjacent the gauge interface 32. The indicator 44 cooperates with the dial 44 for indicating the liquid-level in the vessel. For example, the dial may have a scale having the percentage of the vessel's water volume printed thereon, or may have "FULL", "REFILL" and "EMPTY", colour or other coding for the liquid level. The dial is oriented to the longitudinal axis of the telemetric fitting 30 for viewing from above.

Figure 9:
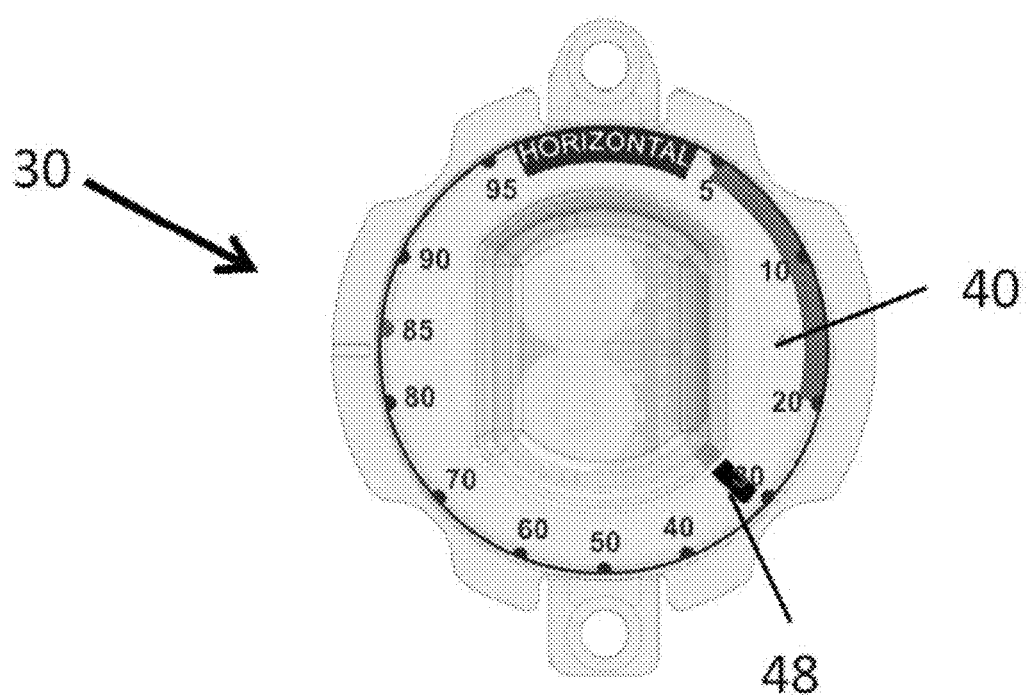
Figure 10:
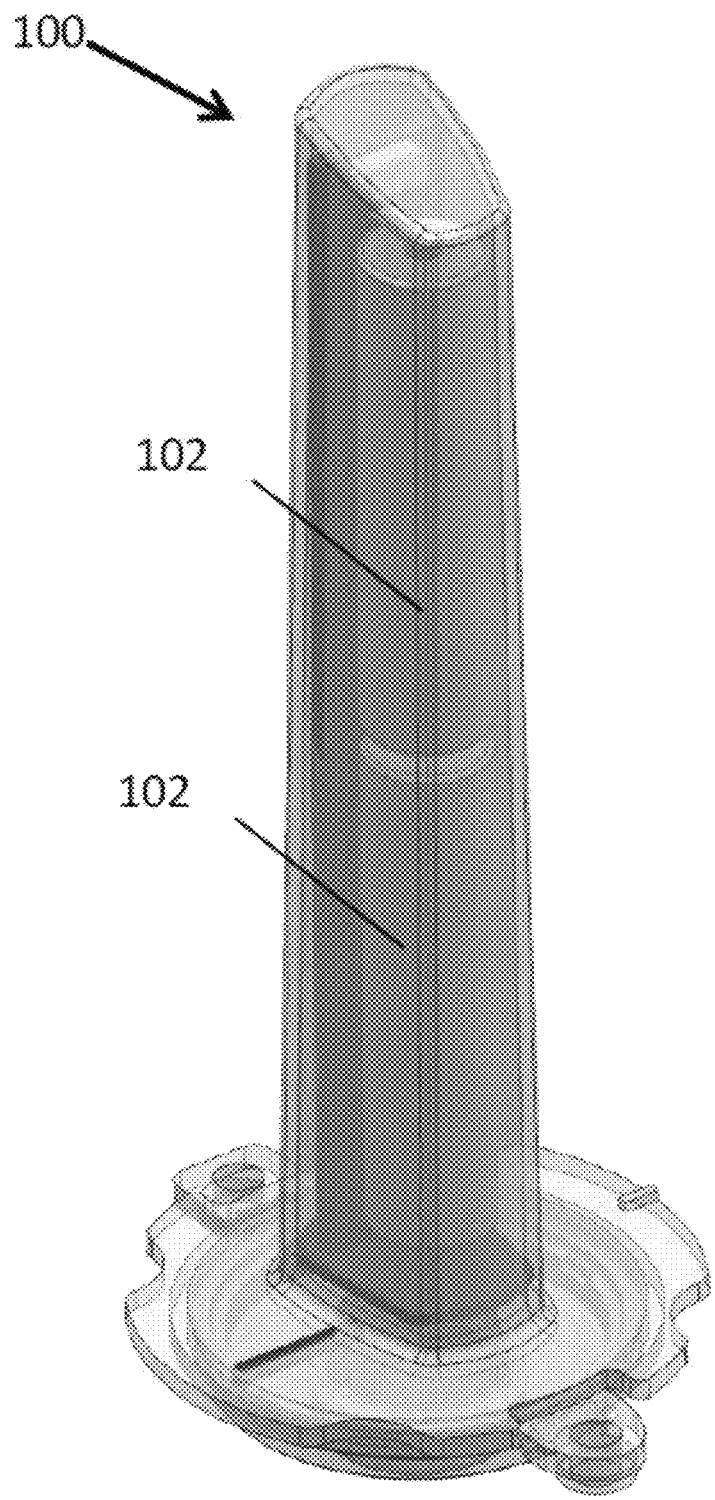

FIG. 9 shows a top view of the telemetric fitting 30, the dial 40 and the pointer 48. The telemetric fitting 30, and consequently the exterior housing 38, does not extend beyond a perimeter 42 of the gauge head 19 when attached to the liquid-level gauge 10.

The physical location of the telemetric device may be used to automatically associate information related to the telemetric device with information related to an asset.

When the telemetric device is determined to be at the target location, the system automatically makes an association in a computer database of information related to the telemetric device with information related to the asset. Conversely, when the telemetric device is determined to no longer be located at the target location, the system may automatically remove an existing association in the computer database between information related to the telemetric device and information related to the asset. In other words the system "disassociates" information related to the telemetric device and information related to the asset.

In one embodiment, the target location is a region which includes the current location of the asset. This situation may arise when the asset has been installed at the target location without the telemetric device. The automatic association occurs when the telemetric device reaches the target area.

In another embodiment, the target location is a future deployment location for an asset, such as a customer address. This situation may arise when the telemetric device has been installed at the asset before the asset has been deployed in the target area. The automatic association may occur when the asset and telemetric device are moved together into the target area.

The telemetric device location, asset location and target location may each be defined by a geolocation space (GLS), which may be a point, two-dimensional region, or three-dimensional space. An example of a point is a single set of latitude & longitude coordinates, and optionally height above sea level. An example of a two-dimensional region is a circle, triangle or polygon centered on a defined point, or a polygon with latitude & longitude coordinates. An example of a three-dimensional space is a sphere centered on a point, or a polyhedral centered on a point. Other examples of locations that may be defined by a GLS include but are not limited to:

- the location at which vehicles should park when making deliveries (vehicles may need to park some distance from the asset for safety reasons or access restrictions);
- the location of a depot where installers collect telemetric devices before installing them on assets;
- the location of a store or warehouse where telemetric devices are stored before being supplied to distributors or consumers.

Each GLS may be defined in many ways and can have a wide variety of shapes and sizes, depending on requirements. For example, the GLS can define:

geographic coordinates (e.g. latitude and longitude) plus rules for defining a boundary in relation to the geographic coordinates, for example:
a circular boundary with a 50 m radius centred on particular geographic coordinates—a square boundary of a particular size centred at distance D directly the north of particular geographic coordinates—a boundary with a complex shape defined by a line passing through set of:
geographic coordinates in a particular order;
a postcode zone with a defined boundary;
a boundary of a property at a particular address;
a locality, suburb, town, city or region with a defined boundary.

If the location of the telemetric device is provided by on-board GPS, the GLS for the telemetric device may be a circle centred on a latitude and longitude. If the position of the device is provided by cellular triangulation, the GLS may be a compass direction and length.

The GLS can change over time. For example, a GLS indicating the location of the telemetric device will change when the telemetric device is moved. Also, the GLS of the telemetric device can change in shape or size, even when the telemetric device is stationary, for example if there is a change in the precision of the GNSS or cell tower triangulation used to locate the telemetric device. In another example, the GLS of an asset may initially be a postcode, but subsequently reduced in size, for example when more precise information about the location of an asset is received. Alternatively, the GLS of an asset can be moved when an asset is moved. The GLS of the telemetric device and asset may be different in size and shape. For example, the GLS for the telemetric device may be in the form of a circular area, while the GLS for the asset may be in the form of a suburb boundary or a property boundary.

Information related to the telemetric device may comprise many types for information, including, but not limited to:
GLS for the telemetric device location;
quantity information transmitted by the telemetric device (e.g. fluid quantity information indicative of the quantity of fluid within the vessel that the device monitors);
operational information related to the operational status of the telemetric device (e.g. battery status);
metadata (e.g. MAC address of telemetric device, time of transmission);
alerts or other messages generated by the telemetric device (e.g. "tank empty");
a serial number or other identifier for the telemetric device;
the name of the manufacturer of the telemetric device;
the brand or model name of the telemetric device;
the year the telemetric device was first activated.

The information related to the telemetric device may be stored in one or more computer database records for the telemetric device. For example, information related to the telemetric device may be stored in two associated records: a first record containing physical details and GLS of the telemetric device; and a second record containing quantity information received from the telemetric device, for example fluid quantity data.

Information related to the asset can include, but is not limited to:
a GLS for a delivery point (the delivery point may be different from the deployed asset
location);
a GLS for the asset location;
target location;

a serial number or other identifier for the asset;
features of the asset, for example: vessel volume, vessel shape, type of gas contents, year of manufacture;
an address of a customer;
a suburb or postcode for the asset location;
customer billing information.

The information related to the asset may be stored in one or more associated computer database records. For example, information related to the asset may be stored in three associated records: a first record containing physical details and GLS of the asset; a second record containing customer account information; and a third record containing gas usage and billing history for the asset.

The information related to the asset can be in turn linked to other information, for example:
a customer account containing a range of customer information such billing details, billing history, contact details;
an account for a depot used by installers of the telemetric device, for example an inventory of telemetric devices currently at a depot awaiting deployment in the field;
an account for a store or warehouse used by suppliers of the telemetric device, for example an inventory of telemetric devices currently in storage and available for supply to installers.

Any database record can be manually associated with another record in the conventional manner.

For example, if the system automatically associates a first and second record, and one of those records is manually associated with a third record, then all three records become associated with each other. This three-way association only lasts while the first and second records remain associated. If the first and second records become disassociated, then only the manual association remains.

Software processes remote from the telemetric device can receive data indicative of the location of the device and automatically determine whether the telemetric device is found to be located at the target location. Software processes can also perform the automatic database association of information related to the telemetric device with information related to the asset.

EXAMPLE 1

Figure 13:
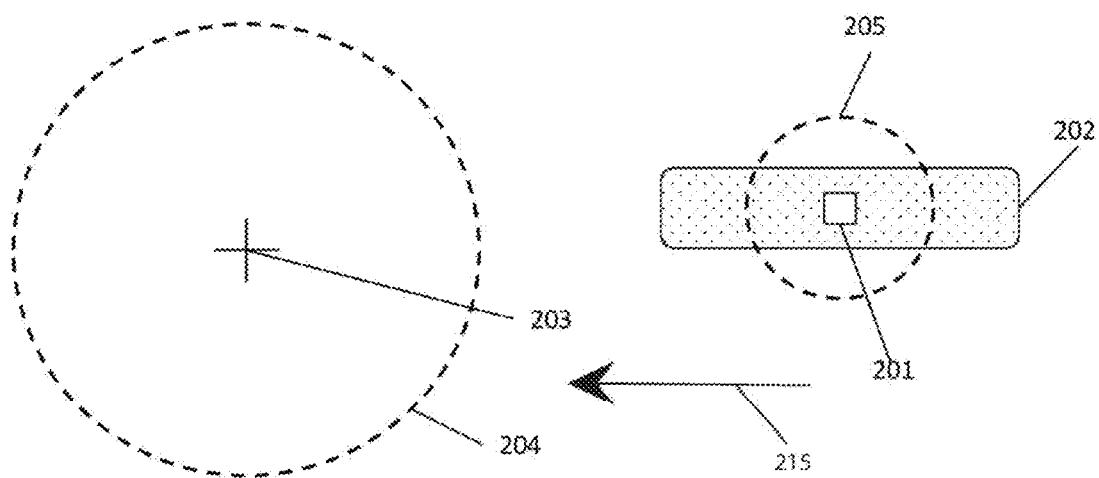
FIGS. 13 to 16 show plan views of a telemetric device and asset before and after moving toward and to a deployment location and therefore after association.

FIG. 13 shows a plan view of a telemetric device 201 attached to an asset 202 (e.g. an LPG vessel) before the asset is taken to a deployment location centred at point 203. As discussed above, the unassociated telemetric device 201 may have been attached or otherwise incorporated into the asset at a location other than at the deployment location, and moved with the asset to the deployment location. The target location information in which a deployment location is located, defines a first geographical boundary and the telemetric device location information defines a second geographical boundary. The remote server correlating the location of the telemetric device with the target location information comprises the remote server determining or resolving whether the second geographic boundary overlaps the first geographical boundary according to a predefined rule.

The predefined rule for example, may set out how much and/or the dimensions of the overlap is required of the first and second geographical boundary. It is understood that any predefined rule that assumes a good match is within the scope of this discussion.

The deployment location accordingly may be within a target location, such that a target location is defined by a first geographical boundary of any suitable dimensions or size. The unassociated telemetric device location information defines a second geographical boundary which may be of any suitable dimensions or size. The arrow 215 may indicate the direction in which the asset and unassociated telemetric device are moving which in this case is in the direction of the deployment location. At some point, the first geometric boundary may overlap the second geometric boundary, at which point may define an event associated with an automatic action rule, for example, an activation event, to generate event data The system for changing an unassociated telemetric device into an associated telemetric device includes that the remote server 217 can be configured to receive target location information (a geographical boundary) indicative of a deployment location of the unassociated telemetric device 201 and the telemetric device 201 can be configured to operate in accordance with an automatic action rule. The processor of the unassociated telemetric device 201 can be configured to receive unassociated telemetric device location information from the location sensing device to provide to the processor the unassociated telemetric device location information in response to the device operating in accordance with the automatic action rule which may trigger providing the location information to the remote server. The unassociated telemetric device 201 can be configured to transmit the unassociated telemetric device location information and the remote server 217 can be configured to receive the unassociated telemetric device location information. The remote server 217 can be configured to correlate the unassociated telemetric device location information with the deployment or target location information and the remote server can be configured to electronically change the unassociated telemetric device into an associated telemetric device so that when the associated telemetric device generates quantity or usage information, the quantity or usage information transmitted by the associated telemetric device is applied to a data store of the remote server related to the vessel identity information. It is understood that a remote server may be a collection of devices and/or mobile device, in the cloud or/and in any suitable configuration. Once a match is made, it may be desirable to initiate a verification process wherein an operator verifies the match manually.

A data store or a database can contain separate records for the unassociated telemetric device 201 and asset 202. The asset record can include a GLS for a target location the area inside a circular region 204, or any other suitable dimensions. The unassociated telemetric device can transmit information about its location (based on GPS signals) which indicate it has a GLS indicated by the dashed circle 205.

Figure 14:
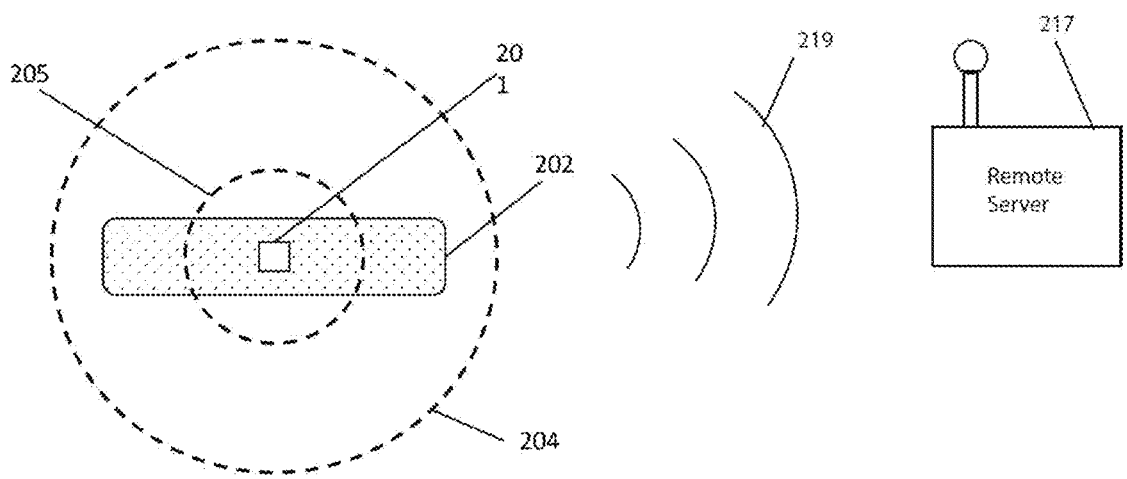

FIG. 14 shows the same device 201 and asset 202 after they have been installed at the installation zone. The estimated GLS 205 of the telemetric device is fully within the circumference of the GLS 204 of the target location, which triggers the system to automatically electronically change the unassociated telemetric device into an associated telemetric device. In so doing, the system can make an association in the database between the unassociated telemetric device record and the asset record so that when the associated telemetric device generates quantity or usage information, the quantity or usage information transmitted by the associated telemetric device is applied to a data store of the remote server related to the vessel identity information. This correlation or association may, for example, result in a link the fluid level in the gas vessel with gas delivery information for the vessel, which enables deliveries to that vessel to be scheduled efficiently and billed to the correct customer.

Although billing is strictly generated from the weights & measures meter on the truck, the telemetric device makes it possible to check that the correct vessel was billed by comparing vessel level data from the telemetric device with the amount and time of a fill from the truck meter.

EXAMPLE 2

Figure 15:
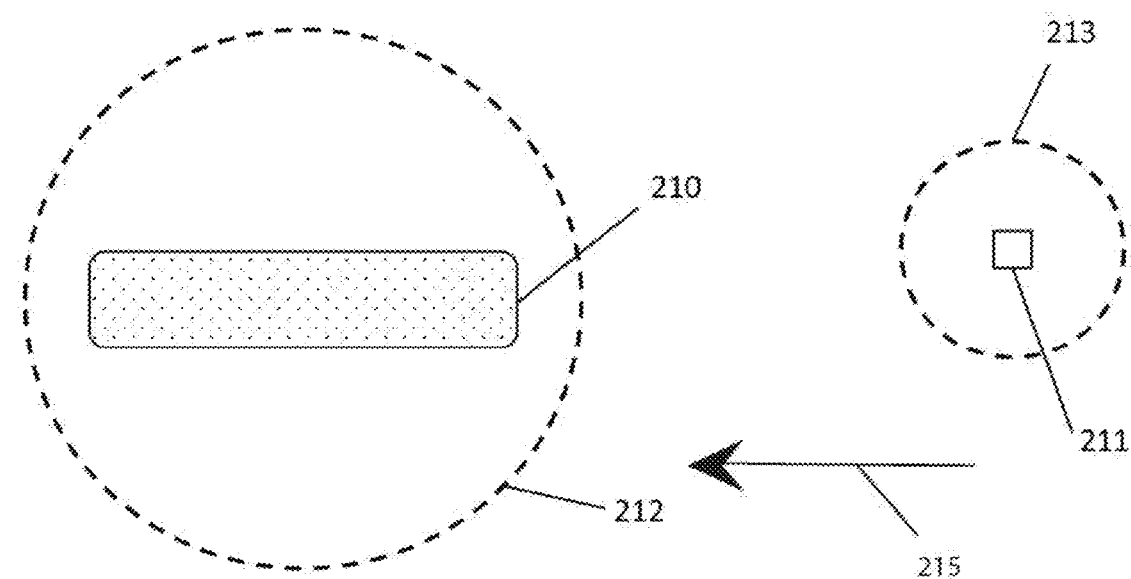

FIG. 15 is a plan view of an asset 210 installed at a deployment location without a telemetric device 211. A database contains separate records for the asset 210 and unassociated telemetric device 211. The asset record includes a GLS for a target location which is the area inside a circular region 212. The unassociated telemetric device 211 transmits information about its GLS (based on GPS signals) which indicate its GLS is defined by a dashed circle 213, and is located outside the target location 212.

Figure 16:
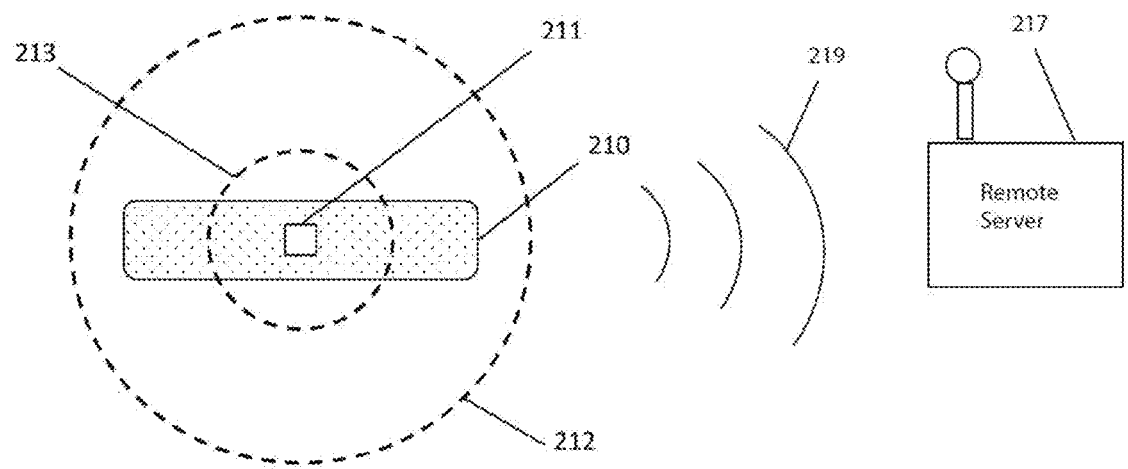

FIG. 16 shows the same device 211 after being installed at the asset 210. The GLS 213 of the unassociated device is now fully within the target location 212, which triggers an automatic electronic change of the unassociated device into an associated device so that there can be an association in the database between the device record and the asset record.

As described, the target location information can define a first geographical boundary and the telemetric device location information can define a second geographical boundary or boundary dimension which can represent a geographical boundary, for example in size, and the step of determining whether the unassociated telemetric device is located at the target location comprises determining whether the second geographic boundary overlaps the first geographical boundary according to a predefined rule. Therefore, the remote server 217 or other device such as a mobile device can be configured to receive target location information indicative of an asset deployment location, the target location information providing a geographical boundary. The remote server can be configured to receive and/or store a boundary dimension or second geographical boundary for the telemetric device, wherein when the device location information is received, the boundary dimension is applied to the device location information to determine if the geographical boundary and the boundary dimension overlap, and therefore whether the unassociated telemetric device is within a proximity to the deployment location. In this way, overlap of these geographical dimensions can indicate that the unassociated telemetric device has reached the target location.

Rules

Below, the various automatic action rules are described including:
  receiving the telemetric device location information, for example, on a periodic basis, a random basis or a scheduled basis;
  receiving quantity or usage-event data by the telemetric device; and/or receiving an indication of an activation event, to generate event data.

The system can include rules, such as automatic action rules relating to the operation of the system and can include automatic actions performed by system management software (e.g. software on a server) remote from the telemetric device. The rules can also include one or more triggers for each action. Examples of actions and their triggers include:
  starting a customer billing cycle, triggered the first time the telemetric device is detected at a target location;
  ending a customer billing cycle, triggered the first time the telemetric device is detected to have left a target location;
  sending an instruction from a remote server to the telemetric device regarding its operation.

The rules can also specify the sending of particular instructions to a telemetric device and the circumstances in which they are sent. Examples of instructions that can be sent to the telemetric device include:
  measure particular kinds of data at particular times e.g. gas level and faults every four hours;
  start transmitting particular kinds of data e.g. device identifier, location, faults, gas level measurements;
  stop transmitting particular kinds of data;
  transmit particular kinds of data at particular intervals of time e.g. daily, weekly, monthly;
  transmit particular kinds of data at particular times of the day e.g. 02:00 hours.

The rules can also specify circumstances in which the telemetric device transmits information.

For example, the rules may specify that the telemetric device is triggered to transmit information in response to:
  time elapsed: the device is triggered to transmit information at predetermined time;
  intervals e.g. every 30 minutes (However, each location check consumes battery power. The battery life will be shortened if the device is in transit or storage for an extended period);
  connection to a sensor: the device is triggered to transmit information when it receives data from a sensor, such as a fluid level sensor;
  change in fluid level may indicate a fill-event and therefore the unassociated device may provide fill-event data: the device is triggered to transmit information when it detects a particular pattern of change in fluid level data. For example, the first time the fluid level rises—which means the vessel is being filled for the first time—can activate a device to start transmitting location data and auto-associate the device with the vessel. This fill-event may occur at the target location as opposed to a fill event occurring, for example, occurring at the depot where new tanks are stored. At the depot, a fill-event may occur, for example, for the purpose of testing the asset or vessel, to generate event data. It is understood that the rules may be modified and/or new rules can be added and/or a rule may be combined with another rule;
  acceleration profile: the device is triggered to transmit information when a particular pattern of acceleration is detected in the device (for example by an accelerometer in the device) for example, an acceleration profile produced by an installer mechanically tapping the device in a particular pattern which is consistent with an activation event, to generate event data;
  magnetic data: a particular pattern of magnetic field data can trigger the device. For example, the trigger can be initiated when the device is attached to a magnetic float gauge, or by an installer passing a magnet over the device in a particular pattern;
  removal of a mechanical seal or keeper: removal of a mechanical seal triggers the device;
  manual triggering: for example, by activating a button or switch on the telemetric device;
  combinations of the above e.g. remove keeper then magnetic activation.

There can be multiple target locations. Each target location can be linked with rules about the operation of the system, for example rules about the operation of the telemetric device and its interactions with other parts of the system. For example, the system can include rules for a target location which defines the information should be transmitted by the telemetric device and when it should be transmitted.

For example, a rule can define that a telemetric device should not transmit fluid level information until the telemetric device has been delivered to the target location, which is the site of a gas vessel. This type of rule can save battery power and communication costs being incurred before the telemetric device arrives at the gas vessel.

Example 1: When the telemetric device is detected to be at a target location which is the deployment site of a vessel, a server transmits an instruction to the telemetric device to make two types of transmission:
- a daily transmission at 02:00 hours of device identifier, faults, gas level measurements; and/or a weekly or monthly transmission at 02:00 hours with the same information plus the location of the telemetric device measured by GNSS (reducing the number of times at which the device calculates geographical location by GNSS helps to extend the battery life).

Example 2: When the telemetric device is detected to be at target location which is a depot where vessels are held temporarily (e.g. for refurbishment or awaiting deployment), a server transmits an instruction to the device to make only one type of transmission:
- a daily transmission at 02:00 hours of the location of the telemetric device measured by GNSS (gas levels are not monitored while in the depot).

The system can include rules which define the circumstances for a telemetric device to be deemed to be located at the target location. The rules can take many forms, for example:
- A telemetric device to be deemed to be located at the target location when 100% of a GLS for the telemetric device overlaps with a GLS for the target location.
- A telemetric device to be deemed to be located at the target location when at least 50% of a GLS for the telemetric device overlaps with a GLS for the target location.
- A telemetric device to be deemed to be located at the target location when at least x % of a GLS for the telemetric device overlaps with a GLS for the target location, where x is defined in the rule and is greater than 0 and up to 100.
- A telemetric device to be deemed to be located at the target location when at least y % of a GLS for the target location overlaps with a GLS for the telemetric device, where y is defined in the rule and is greater than 0 and up to 100.

Validation Conditions:

As a cross check, validation can be performed to further refine the process to assure that the now associated telemetric device is appropriate and/or unique. Accordingly, it may be automatically assured that the associated telemetric device is reporting quantity or usage date relating to the correct vessel or asset. To validate, an asset may be identified by attributes, such as vessel or asset capacity or orientation, such as vertical or horizontal. If a device that is configured to operate with a vessel or asset having a different capacity or orientation than that expected at the target location, then a validation may fail. Accordingly, various conditions or rules may be set up and/or applied to validate that that the associated telemetric device is reporting quantity or usage date relating to the correct vessel or asset. In the event that automatic validation conditions cannot be affected, then manual validation conditions might be required. If neither the automatic nor the manual validation can occur, then the method may include automatic disassociation, or otherwise, the unassociated telemetric device does not become an associated telemetric device.

Automatic Disassociation Conditions:

Disassociation may occur in the event that the associated electronic device is separated from the vessel or other type of asset, or the boundaries of their respective locations separate so that they do not overlap to a sufficient degree or at all. In that case, a different unassociated telemetric device might become an associated telemetric device. This may occur for example, when the device needs to be replaced, or if the vessel or asset is moved.

Determining the Location of the Telemetric Device

Many location-sensing methods can be used to determine the location of the telemetric device, a location sensing device may be for example:
- GNSS;
- Wi-Fi positioning (which requires access to a database of Wi-Fi networks and their locations);
- network-supported location services (cell tower triangulation for example GSM or LTE, satellite communications, low-power wide-area network or LPWAN (public and private) for example LoRa or Sigfox, or web browser Geolocation API);
- dead reckoning: calculate location relative to a previous known location e.g. gyroscope and accelerometer chip;
- direction and range finding technologies;
- the address of a fixed telephone line service.

Telemetry Examples

Many telemetry techniques may be used to enable the telemetric device to transmit and receive data, for example:
- fixed telephone or internet line (copper, fibre);
- cellular network;
- LPWAN (public and private) e.g. LoRa, Sigfox;
- private radio link e.g. ISM band;
- Wi-Fi;
- satellite communications.

Optionally, the telemetric device can be arranged to transmit to another telemetric device which is capable of transmitting to a network. For example, the transmission between telemetric devices can be through private radio link, and the transmission to the network can be via a cellular network, LPWAN or fixed telephone or internet line.

The Telemetric Device

There are at least two categories of telemetric device:
1. a telemetric device capable of determining its own location, such as with GNSS or Wi-Fi sniffing (which requires access to an external database of Wi-Fi networks and their locations);
2. a telemetric device which can be located externally by triangulation from a network, such as a cell phone or LPWAN network.

In both cases, the telemetric device may include:
- hardware for communicating with the data network (e.g. cell communications, LPWAN, private radio link, satellite, Wi-Fi);
- a microcontroller to process information and coordinate components in the telemetric device.

Where the telemetric device is capable of determining its own location, it further includes hardware, such as a GNSS receiver.

The telemetric device can also have one or more sensors, such as a gas level sensor, but this is not essential in all embodiments.

FIG. 17 shows an example of the information contained in an SQL database table 230 for a telemetric device and an SQL database table 232 for an asset. The table 230 for the telemetric device is called device_record and contains information related to a telemetric device. The table 232 is called asset_record and contains information related to an asset. In the device_record table 230, the device_id column is a primary key, and in the asset record table 232, the asset_id column is a primary key. Neither the device_record table 230 nor the asset_record table 232 contain data in both the device_id and device_record columns. The tables 230, 232 in FIG. 17 are therefore not associated and cannot be joined. While this embodiment uses an SQL database, generally any suitable relational or non-relational database or data store may be used.

The device_record table 230 contains location information (a GLS) for the telemetric device in fields called Lat, Long and precision. The asset_record table 232 contains a GLS for a target location in fields called Lat, Long and radius. The device is not located at the target location, as indicated by the different Lat and Long data in the two tables 230, 232.

FIG. 18 shows an updated version of the tables in FIG. 17 after new location data has been received from the unassociated telemetric device and added to the device_record table 234 in the Lat and Long columns. The Lat and Long data in the device_record table 234 now match the Lat and Long data in the asset_record table 236, which means the telemetric device is located at the target location. The system has compared the Lat and Long data in the two tables 234, 236 and identified that there is a match. The match has triggered the system to automatically associate the device_record table 234 with the asset_record table 236 by copying the asset_id information in the asset_record table 236 into the asset_id field of the device_record table 234. A join command can now be used to join these two records using the asset_id column.

In the example shown in FIGS. 17 and 18, the quantity information transmitted by the telemetric device is not included in the device_record table 230, 234. The quantity information is stored in a separate table (not shown) associated with the device_record table by having the same device_id column populated with data.

Associating sets of information X and Y is understood here to mean relating X and Y, either directly or indirectly, so that if X is known then Y can be ascertained (and vice versa). In a relational database, tables X and Y are associated if they can be joined.

System Architecture

Different embodiments of a system for monitoring a quantity related to an asset may have different architectures.

Figure 19:
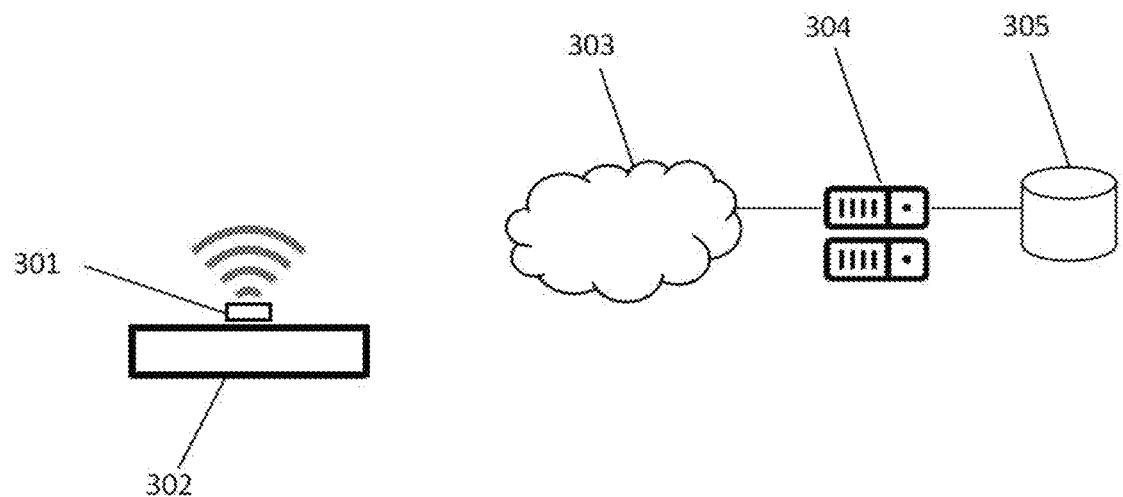
FIGS. 19 to 21 shows various alternative architectures for embodiments of systems for monitoring a quantity related to an asset.

FIG. 19 shows an example of an architecture in an embodiment of a system. The telemetric device 301 is installed at an asset 302 such as a gas vessel. The telemetric device is equipped for wireless communication via a data network 303 to a server 304 which runs software processes to coordinate the system. The server is linked to a database 305 to store information for example information related to the telemetric device 301 and information related to the asset 302. The wireless communication can be implemented in many ways, such as a cellular network, LPWAN, or even satellite communications.

Figure 20:
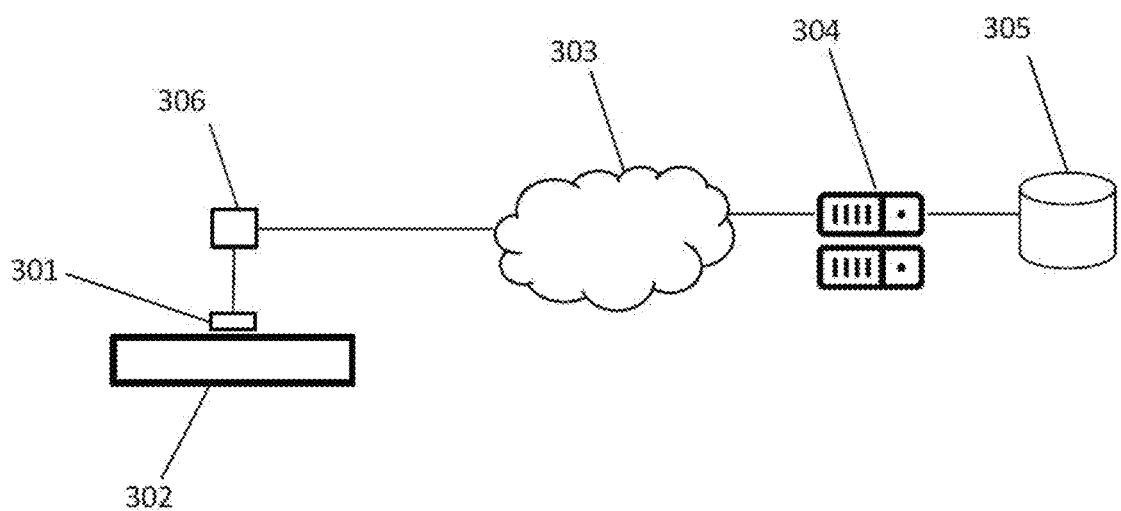

FIG. 20 show another example of a system architecture, where parts similar or identical to those in FIG. 13 are similarly indicated. In this example, the telemetric device 301 communicates via a fixed line to a modem 306 which communicates via PSTN with the data network 303.

Figure 21:
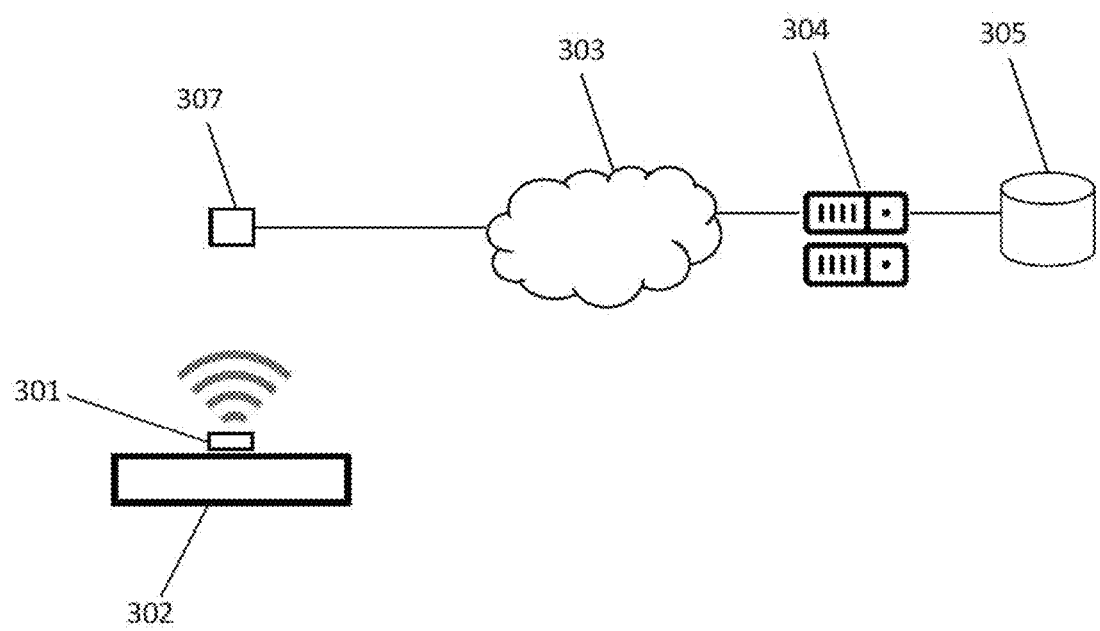

FIG. 21 shows another example of a system architecture. In this example, the telemetric device 301 communicates via a private radio link with a transmitter 307 which communicates via PSTN with the data network 303.

Now that embodiments have been described, it will be appreciated that some embodiments may have some of the following advantages:

Data entry errors may be reduced or eliminated.
Manual communication of identifiers may be reduced or eliminated, reducing labour and costs.
Lower skilled workers may be required because processes are automated.
Customer billing may be initiated at the time of association of identifiers.
Location sensing may reduce the number of lost things.

Variations and/or modifications may be made to the embodiments described without departing from the spirit or ambit of the invention. The present embodiments are, therefore, to be considered in all respects as illustrative and not restrictive. Reference to a feature disclosed herein does not mean that all embodiments must include the feature.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A method of a system for automatically electronically disassociating an associated telemetric device wherein the associated telemetric device is associated with a vessel identity at a remote server, the system including rules relating to the operation of the system, the associated telemetric device comprising a processor and being configured to detect and transmit quantity or usage data and being configured for location sensing, wherein the associated telemetric device is configured to communicate with a remote server, the method comprising:
   the associated telemetric device operating in accordance with a rule comprising an automatic action rule;
   in response to the associated telemetric device operating in accordance with the automatic action rule, the processor receiving location information of the associated telemetric device;
   the associated telemetric device transmitting the location information;
   the remote server receiving the location information;
   the remote server determining whether the associated telemetric device is separated from the vessel or whether boundaries of the locations of the associated telemetric device and the target location are separated so that they do not overlap to a sufficient degree or at all;
   if the remote server determines that the associated telemetric device is separated from the vessel or whether boundaries of the locations of the associated telemetric device and the target location are separated so that they do not overlap to a sufficient degree or at all, disassociating the associated telemetric device so that the associated telemetric device becomes a disassociated telemetric device.

2. The method of claim 1 wherein the associated telemetric device further comprises an accelerometer, wherein the automatic action rule is triggered when the associated telemetric device is detected to have moved according to the accelerometer.

3. The method of claim 1 wherein the automatic action rule triggers the associated telemetric device to detect that it has moved according to the location sensing;
the associated telemetric device transmitting the location information to the remote server.

4. A system for automatically electronically disassociating an associated telemetric device wherein the associated telemetric device is associated with a vessel identity at a remote server, the system including rules relating to the operation of the system, the associated telemetric device comprising a processor and being configured to detect and transmit quantity or usage data and being configured for location sensing, wherein the associated telemetric device is configured to communicate with a remote server, the system comprising:
the associated telemetric device configured to operate in accordance with a rule comprising an automatic action rule;
in response to the associated telemetric device operating in accordance with the automatic action rule, the processor configured to receive location information of the associated telemetric device from the location sensing;
the associated telemetric device configured to transmit the location information;
the remote server configured to receive the location information;
the remote server configured to determine whether the associated telemetric device is separated from the vessel or whether boundaries of the locations of the associated telemetric device and the target location are separated so that they do not overlap to a sufficient degree or at all;
if the remote server determines that the associated telemetric device is separated from the vessel or whether boundaries of the locations of the associated telemetric device and the target location are separated so that they do not overlap to a sufficient degree or at all, the remote server configured to disassociate the associated telemetric device so that the associated telemetric device becomes a disassociated telemetric device.

5. The system of claim 4 wherein the associated telemetric device further comprises an accelerometer, wherein the automatic action rule is triggered when the associated telemetric device is detected to have moved according to the accelerometer.

6. The system of claim 4 wherein the automatic action rule is configured to trigger the associated telemetric device to detect that it has moved according to the location sensing; the associated telemetric device is configured to transmit the location information to the remote server.

7. A system for automatically electronically associating asset identity information of an asset with an unassociated telemetric device, the unassociated telemetric device comprising a processor and being configured to detect and transmit quantity or usage data and being configured for location sensing, wherein the unassociated telemetric device is configured to communicate with a remote server, the method comprising the steps of:
the remote server configured to receive the asset identity information comprising a deployment location for the unassociated telemetric device;
the unassociated telemetric device configured to operate in accordance with an automatic action rule;
in response to the unassociated telemetric device operating in accordance with the automatic action rule, the processor being configured to receive location information of the unassociated telemetric device according to the location sensing;
the unassociated telemetric device configured for location sensing;
the remote server configured to receive the location information;
the remote server configured to correlate the location information with the asset identity information when resolving that the location information represents that the unassociated telemetric device is within a proximity to the deployment location, and
the remote server being configured to automatically electronically associate the unassociated telemetric device with the asset identity information, resulting in the unassociated telemetric device becoming an associated telemetric device, so that when the associated telemetric device generates quantity or usage information, the quantity or usage information transmitted by the associated telemetric device is applied to a data store of the remote server related to the asset identity information.

8. The system of claim 7, wherein operating in accordance with the automatic action rule comprises at least one of receiving the location information of the unassociated telemetric device, receiving quantity or usage event data transmitted by the unassociated telemetric device and receiving an indication of an activation event of the unassociated telemetric device.

9. The system of claim 7 wherein the deployment location defines a first geographical boundary and the location information defines a second geographical boundary, and correlating the location information with the asset identity information comprises determining whether the second geographic boundary overlaps with the first geographical boundary according to a predefined rule.

10. The system of claim 7 further comprising the remote server being configured to automatically validate the correlation of the associated telemetric device with the deployment location in accordance with validation conditions.

11. The system of claim 7 further comprising the remote server being configured to disassociate the associated telemetric device from the asset identity information.

* * * * *